US012347388B2

(12) United States Patent
Kim

(10) Patent No.: US 12,347,388 B2
(45) Date of Patent: Jul. 1, 2025

(54) GATE DRIVER AND DISPLAY DEVICE

(71) Applicant: SAMSUNG DISPLAY CO., LTD., Yongin-si (KR)

(72) Inventor: Hong-Kyu Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/523,635

(22) Filed: Nov. 29, 2023

(65) Prior Publication Data

US 2024/0363078 A1 Oct. 31, 2024

(30) Foreign Application Priority Data

Apr. 27, 2023 (KR) ........................ 10-2023-0055612

(51) Int. Cl.

| | |
|---|---|
| ***G09G 3/3266*** | (2016.01) |
| ***G09G 3/20*** | (2006.01) |
| ***G09G 3/3233*** | (2016.01) |

(52) U.S. Cl.

CPC ......... *G09G 3/3266* (2013.01); *G09G 3/2096* (2013.01); *G09G 3/3233* (2013.01); (Continued)

(58) Field of Classification Search

CPC ........ G07F 17/305; G07F 7/0873; G07F 7/04; H04N 21/482; H04N 21/41415; H04N 21/8113; G06F 3/0482; G06F 3/041; G06F 16/44; G06F 3/04842; G06F 16/686; G06F 3/165; G06F 16/639; G06F 16/632; G06F 16/438; G06F 16/64; G06F 3/162; G06F 3/0412; G06F 3/04883; G06F 3/04847; G06F 3/04817; G06F 3/0481; G06F 3/0484; G06F 3/0488; G06Q 30/02; H05K 5/02; H05K 5/0247; H05K 5/06; H05K 5/0017; H05K 5/0221; A47B 81/06; G11B 27/34

See application file for complete search history.

(56) References Cited

U.S. PATENT DOCUMENTS

| | | | | |
|---|---|---|---|---|
| 9,905,155 B2 | 2/2018 | Zhang et al. | | |
| 2010/0156869 A1* | 6/2010 | Lee | ........................ | G11C 19/28 345/94 |

(Continued)

FOREIGN PATENT DOCUMENTS

| | | |
|---|---|---|
| CN | 114141191 | 3/2022 |
| JP | 5496270 | 3/2014 |
| KR | 10-2022-0030495 | 3/2022 |

*Primary Examiner* — Shaheda A Abdin

(74) *Attorney, Agent, or Firm* — F. CHAU & ASSOCIATES, LLC

(57) ABSTRACT

A gate driver includes M active stages configured to generate first through M-th carry signals and first through M-th gate signals based on clock signals, where M is an integer greater than or equal to 4, and K back dummy stages configured to generate (M+1)-th through (M+K)-th carry signals based on the clock signals, where K is an integer greater than or equal to 3. An N-th active stage of the M active stages discharges a control node of the N-th active stage based on an (N+3)-th carry signal, where N is an integer greater than or equal to 1, and is less than or equal to M. At least one back dummy stage of the K back dummy stages discharges a control node of the at least one back dummy stage based on a corresponding clock signal of the clock signals.

20 Claims, 18 Drawing Sheets

(52) U.S. Cl.
CPC ............... *G09G 2300/0819* (2013.01); *G09G 2300/0842* (2013.01); *G09G 2310/0286* (2013.01); *G09G 2310/08* (2013.01)

(56) References Cited

U.S. PATENT DOCUMENTS

| | | | | |
|---|---|---|---|---|
| 2014/0355733 | A1* | 12/2014 | Kim | G11C 19/28<br>377/67 |
| 2016/0210927 | A1* | 7/2016 | Cho | G09G 3/3696 |
| 2016/0372023 | A1* | 12/2016 | Zhang | G09G 3/2092 |
| 2022/0068194 | A1 | 3/2022 | Kim et al. | |
| 2022/0208079 | A1* | 6/2022 | Jo | G09G 3/32 |
| 2022/0383821 | A1* | 12/2022 | No | G09G 3/3266 |

* cited by examiner

GATE DRIVER AND DISPLAY DEVICE

CROSS-REFERENCE TO RELATED APPLICATION(S)

This U.S. patent application claims priority under 35 U.S.C. § 119 to Korean Patent Application No. 10-2023-0055612, filed on Apr. 27, 2023 in the Korean Intellectual Property Office (KIPO), the disclosure of which is incorporated by reference in its entirety herein.

1. TECHNICAL FIELD

Embodiments of the present inventive concept are generally directed to a display device, and more particularly to a gate driver, and a display device that includes the gate driver.

2. DISCUSSION OF RELATED ART

A display device includes a display panel for displaying an image. A gate driver of a display device may sequentially provide gate signals to pixels of the display panel on a row-by-row basis. The gate driver may be implemented in a form of a shift register including a plurality of stages to provide the gate signals on the row-by-row basis. Each stage may charge a control node (or a Q node) based on a carry signal of a previous stage, may output a gate signal and/or a carry signal based on a voltage of the charged control node, and may discharge the control node based on a carry signal of a next stage.

The gate driver may further include a back (or bottom) dummy stage subsequent to the plurality of stages to perform a discharge operation. The discharge operation may discharge a charge of a control node or an output node of a last stage among the stages using a separate reset signal. However, an area of the gate driver needs to be larger to accommodate an additional line for transferring the separate reset signal, which may prevent a size of the display panel from being increased. Further, an operation of the gate driver may not be performed normally if the reset signal is not generated at an appropriate time.

SUMMARY

At least one embodiment provides a gate driver capable of normally operating without relying on a separate reset signal.

At least one embodiment provides a display device including a gate driver capable of operating normally without relying on a separate reset signal.

According to an embodiment, there is provided a gate driver including M active stages configured to generate first through M-th carry signals and first through M-th gate signals based on clock signals, and K back dummy stages configured to generate (M+1)-th through (M+K)-th carry signals based on the clock signals, where M is an integer greater than or equal to 4, and K is an integer greater than or equal to 3. An N-th active stage of the M active stages discharges a control node of the N-th active stage based on an (N+3)-th carry signal, where N is an integer greater than or equal to 1, and is less than or equal to M. At least one back dummy stage of the K back dummy stages discharges a control node of the at least one back dummy stage based on a corresponding clock signal of the clock signals.

In an embodiment, the N-th active stage may discharge a gate output node and a carry output node of the N-th active stage based on an (N+2)-th carry signal, and the at least one back dummy stage may discharge a gate output node and a carry output node of the at least one back dummy stage based on the corresponding clock signal.

In an embodiment, the N-th active stage may charge the control node of the N-th active stage based on an (N−3)-th carry signal, and an L-th back dummy stage of the K back dummy stages may charge a control node of the L-th back dummy stage based on a (L−2)-th carry signal, where L is an integer greater than or equal to 3, and is less than or equal to K.

In an embodiment, the clock signals may include first, second, third, fourth, fifth and sixth clock signals, and the K back dummy stages may include first, second, third and fourth back dummy stages. The first back dummy stage may discharge a control node of the first back dummy stage based on an (M+4)-th carry signal generated by the fourth back dummy stage, the second back dummy stage may discharge a control node of the second back dummy stage based on the (M+4)-th carry signal generated by the fourth back dummy stage, the third back dummy stage may discharge a control node of the third back dummy stage based on the fifth clock signal, and the fourth back dummy stage may discharge a control node of the fourth back dummy stage based on the sixth clock signal.

In an embodiment, the first back dummy stage may discharge a gate output node and a carry output node of the first back dummy stage based on an (M+3)-th carry signal generated by the third back dummy stage, the second back dummy stage may discharge a gate output node and a carry output node of the second back dummy stage based on the (M+4)-th carry signal generated by the fourth back dummy stage, the third back dummy stage may discharge a gate output node and a carry output node of the third back dummy stage based on the fifth clock signal, and the fourth back dummy stage may discharge a gate output node and a carry output node of the fourth back dummy stage based on the sixth clock signal.

In an embodiment, the first back dummy stage may charge the control node of the first back dummy stage based on an (M−2)-th carry signal generated by an (M−2)-th active stage, the second back dummy stage may charge the control node of the second back dummy stage based on an (M−1)-th carry signal generated by an (M−1)-th active stage, the third back dummy stage may charge the control node of the third back dummy stage based on the (M+1)-th carry signal generated by the first back dummy stage, and the fourth back dummy stage may charge the control node of the fourth back dummy stage based on an (M+2)-th carry signal generated by the second back dummy stage.

In an embodiment, the clock signals may include first, second, third, fourth, fifth and sixth clock signals, and the K back dummy stages may include first, second, third and fourth back dummy stages. The first back dummy stage may discharge a control node of the first back dummy stage based on an (M+4)-th carry signal generated by the fourth back dummy stage, the second back dummy stage may discharge a control node of the second back dummy stage based on the fourth clock signal, the third back dummy stage may discharge a control node of the third back dummy stage based on the fifth clock signal, and the fourth back dummy stage may discharge a control node of the fourth back dummy stage based on the sixth clock signal.

In an embodiment, the control node of each of the K back dummy stages may include a scan control node and a sensing control node. Each of the K back dummy stages may include a scan input circuit configured to charge the scan control node based on a previous scan carry signal, a sensing input circuit configured to charge the sensing control node based on a previous sensing carry signal, a scan inverting circuit configured to control a voltage of a scan inverting node based on a voltage of the scan control node, a sensing inverting circuit configured to control a voltage of a sensing inverting node based on a voltage of the sensing control node, a scan output circuit configured to control a scan output node based on the voltage of the scan control node and the voltage of the scan inverting node, a sensing output circuit configured to control a sensing output node based on the voltage of the sensing control node and the voltage of the sensing inverting node, a scan carry output circuit configured to control a scan carry output node based on the voltage of the scan control node and the voltage of the scan inverting node, a sensing carry output circuit configured to control a sensing carry output node based on the voltage of the sensing control node and the voltage of the sensing inverting node, a scan discharging circuit configured to discharge the scan control node, and a sensing discharging circuit configured to discharge the sensing control node.

In an embodiment, wherein the clock signals may include first, second, third, fourth, fifth and sixth scan clock signals, first, second, third, fourth, fifth and sixth sensing clock signals, and first, second, third, fourth, fifth and sixth carry clock signals, the K back dummy stages may include first, second, third and fourth back dummy stages, and the first through (M+K)-th carry signals may include first through (M+4)-th scan carry signals and first through (M+4)-th sensing carry signals. The scan discharging circuit of the first back dummy stage may discharge the scan control node of the first back dummy stage in response to the (M+4)-th scan carry signal output by the scan carry output circuit of the fourth back dummy stage, the sensing discharging circuit of the first back dummy stage may discharge the sensing control node of the first back dummy stage in response to the (M+4)-th sensing carry signal output by the sensing carry output circuit of the fourth back dummy stage, the scan discharging circuit of the second back dummy stage may discharge the scan control node of the second back dummy stage in response to the (M+4)-th scan carry signal or the fourth carry clock signal, the sensing discharging circuit of the second back dummy stage may discharge the sensing control node of the second back dummy stage in response to the (M+4)-th sensing carry signal or the fourth carry clock signal, the scan discharging circuit of the third back dummy stage may discharge the scan control node of the third back dummy stage in response to the fifth carry clock signal, the sensing discharging circuit of the third back dummy stage may discharge the sensing control node of the third back dummy stage in response to the fifth carry clock signal, the scan discharging circuit of the fourth back dummy stage may discharge the scan control node of the fourth back dummy stage in response to the sixth carry clock signal, and the sensing discharging circuit of the fourth back dummy stage may discharge the sensing control node of the fourth back dummy stage in response to the sixth carry clock signal.

In an embodiment, the scan output circuit of the first back dummy stage may discharge the scan output node of the first back dummy stage in response to an (M+3)-th scan carry signal output by the scan carry output circuit of the third back dummy stage, and the scan carry output circuit of the first back dummy stage may discharge the scan carry output node of the first back dummy stage in response to the (M+3)-th scan carry signal. The sensing output circuit of the first back dummy stage may discharge the sensing output node of the first back dummy stage in response to an (M+3)-th sensing carry signal output by the sensing carry output circuit of the third back dummy stage, and the sensing carry output circuit of the first back dummy stage may discharge the sensing carry output node of the first back dummy stage in response to the (M+3)-th sensing carry signal. The scan output circuit of the second back dummy stage may discharge the scan output node of the second back dummy stage in response to the (M+4)-th scan carry signal output by the scan carry output circuit of the fourth back dummy stage, and the scan carry output circuit of the second back dummy stage may discharge the scan carry output node of the second back dummy stage in response to the (M+4)-th scan carry signal. The sensing output circuit of the second back dummy stage may discharge the sensing output node of the second back dummy stage in response to the (M+4)-th sensing carry signal output by the sensing carry output circuit of the fourth back dummy stage, and the sensing carry output circuit of the second back dummy stage may discharge the sensing carry output node of the second back dummy stage in response to the (M+4)-th sensing carry signal. The scan output circuit of the third back dummy stage may discharge the scan output node of the third back dummy stage in response to the fifth carry clock signal, and the scan carry output circuit of the third back dummy stage may discharge the scan carry output node of the third back dummy stage in response to the fifth carry clock signal. The sensing output circuit of the third back dummy stage may discharge the sensing output node of the third back dummy stage in response to the fifth carry clock signal, and the sensing carry output circuit of the third back dummy stage may discharge the sensing carry output node of the third back dummy stage in response to the fifth carry clock signal. The scan output circuit of the fourth back dummy stage may discharge the scan output node of the fourth back dummy stage in response to the sixth carry clock signal, and the scan carry output circuit of the fourth back dummy stage may discharge the scan carry output node of the fourth back dummy stage in response to the sixth carry clock signal. The sensing output circuit of the fourth back dummy stage may discharge the sensing output node of the fourth back dummy stage in response to the sixth carry clock signal, and the sensing carry output circuit of the fourth back dummy stage may discharge the sensing carry output node of the fourth back dummy stage in response to the sixth carry clock signal.

In an embodiment, the scan input circuit of the first back dummy stage may charge the scan control node of the first back dummy stage in response to an (M−2)-th scan carry signal generated by an (M−2)-th active stage as the previous scan carry signal, and the sensing input circuit of the first back dummy stage may charge the sensing control node of the first back dummy stage in response to an (M−2)-th sensing carry signal generated by the (M−2)-th active stage as the previous sensing carry signal. The scan input circuit of the second back dummy stage may charge the scan control node of the second back dummy stage in response to an (M−1)-th scan carry signal generated by an (M−1)-th active stage as the previous scan carry signal, and the sensing input circuit of the second back dummy stage may charge the sensing control node of the second back dummy stage in response to an (M−1)-th sensing carry signal generated by the (M−1)-th active stage as the previous sensing carry signal. The scan input circuit of the third back dummy stage may charge the scan control node of the third back dummy stage in response to an (M+1)-th scan carry signal generated by the scan carry output circuit of the first back dummy stage as the previous scan carry signal, and the sensing input circuit of the third back dummy stage may charge the sensing control node of the third back dummy stage in response to an (M+1)-th sensing carry signal generated by the sensing carry output circuit of the first back dummy stage as the previous scan carry signal. The scan input circuit of the fourth back dummy stage may charge the scan control node of the fourth back dummy stage in response to an (M+2)-th scan carry signal generated by the scan carry output circuit of the second back dummy stage as the previous scan carry signal, and the sensing input circuit of the fourth back dummy stage may charge the sensing control node of the fourth back dummy stage in response to an (M+2)-th sensing carry signal generated by the sensing carry output circuit of the second back dummy stage as the previous scan carry signal.

In an embodiment, the clock signals may include first, second, third, fourth, fifth and sixth scan clock signals, first, second, third, fourth, fifth and sixth sensing clock signals, and first, second, third, fourth, fifth and sixth carry clock signals, the K back dummy stages may include first, second, third and fourth back dummy stages, and the first through (M+K)-th carry signals may include first through (M+4)-th scan carry signals and first through (M+4)-th sensing carry signals. The scan discharging circuit of the first back dummy stage may discharges the scan control node of the first back dummy stage in response to the (M+4)-th scan carry signal output by the scan carry output circuit of the fourth back dummy stage, and the sensing discharging circuit of the first back dummy stage may discharge the sensing control node of the first back dummy stage in response to the (M+4)-th sensing carry signal output by the sensing carry output circuit of the fourth back dummy stage. The scan discharging circuit of the second back dummy stage may discharge the scan control node of the second back dummy stage in response to the (M+4)-th scan carry signal or the fourth scan clock signal, and the sensing discharging circuit of the second back dummy stage may discharge the sensing control node of the second back dummy stage in response to the (M+4)-th sensing carry signal or the fourth sensing clock signal. The scan discharging circuit of the third back dummy stage may discharge the scan control node of the third back dummy stage in response to the fifth scan clock signal, and the sensing discharging circuit of the third back dummy stage may discharge the sensing control node of the third back dummy stage in response to the fifth sensing clock signal. The scan discharging circuit of the fourth back dummy stage may discharge the scan control node of the fourth back dummy stage in response to the sixth scan clock signal, and the sensing discharging circuit of the fourth back dummy stage may discharge the sensing control node of the fourth back dummy stage in response to the sixth sensing clock signal.

In an embodiment, the scan input circuit may include a first scan transistor including a gate receiving the previous scan carry signal, a first terminal receiving the previous scan carry signal, and a second terminal, a second scan transistor including a gate receiving the previous scan carry signal, a first terminal connected to the second terminal of the first scan transistor, and a second terminal connected to the scan control node, and a third scan transistor including a gate connected to the scan control node, a first terminal receiving a high gate voltage, and a second terminal connected to the first terminal of the second scan transistor. The sensing input circuit may include a first sensing transistor including a gate receiving the previous sensing carry signal, a first terminal receiving the previous sensing carry signal, and a second terminal, a second sensing transistor including a gate receiving the previous sensing carry signal, a first terminal connected to the second terminal of the first sensing transistor, and a second terminal connected to the sensing control node, and a third sensing transistor including a gate connected to the sensing control node, a first terminal receiving the high gate voltage, and a second terminal connected to the first terminal of the second sensing transistor.

In an embodiment, the scan inverting circuit may include a first scan transistor (e.g., SCT4) including a gate receiving a direct current (DC) voltage, a first terminal receiving the DC voltage, and a second terminal, a second scan transistor (e.g., SCT5) including a gate connected to the second terminal of the first scan transistor, a first terminal receiving the DC voltage, and a second terminal connected to the scan inverting node, a third scan transistor including a gate connected to the scan control node, a first terminal connected to the gate of the second scan transistor, and a second terminal receiving a second low gate voltage, and a fourth scan transistor (e.g., SCT7) including a gate connected to the scan control node, a first terminal connected to the scan inverting node, and a second terminal receiving a first low gate voltage. The sensing inverting circuit may include a first sensing transistor (e.g., SST4) including a gate receiving the DC voltage, a first terminal receiving the DC voltage, and a second terminal, a second sensing transistor (e.g., SST5) including a gate connected to the second terminal of the first sensing transistor, a first terminal receiving the DC voltage, and a second terminal connected to the sensing inverting node, a third sensing transistor (e.g., SST6) including a gate connected to the sensing control node, a first terminal connected to the gate of the second sensing transistor, and a second terminal receiving the second low gate voltage, and a fourth sensing transistor (e.g., SST7) including a gate connected to the sensing control node, a first terminal connected to the sensing inverting node, and a second terminal receiving the first low gate voltage.

In an embodiment, the clock signals may include first, second, third, fourth, fifth and sixth scan clock signals, first, second, third, fourth, fifth and sixth sensing clock signals, and first, second, third, fourth, fifth and sixth carry clock signals. The scan output circuit may include a first scan transistor (e.g., SCT8) including a gate connected to the scan control node, a first terminal receiving one of the first through sixth scan clock signals, and a second terminal connected to the scan output node, a first capacitor including a first electrode connected to the scan control node and a second electrode connected to the scan output node, a second scan transistor (e.g., SCT9) including a gate connected to the scan inverting node, a first terminal connected to the scan output node, and a second terminal receiving a second low gate voltage, and a tenth scan transistor including a gate receiving a next scan carry signal or one of the first through sixth carry clock signals, a first terminal connected to the scan output node, and a second terminal receiving the second low gate voltage. The sensing output circuit may include a first sensing transistor (e.g., SST8) including a gate connected to the sensing control node, a first terminal receiving one of the first through sixth sensing clock signals, and a second terminal connected to the sensing output node, a second capacitor including a first electrode connected to the sensing control node and a second electrode connected to the sensing output node, a second sensing transistor (e.g., SST9) including a gate connected to the sensing inverting node, a first terminal connected to the sensing output node, and a second terminal receiving the second low gate voltage, and a third sensing transistor (e.g., SST10) including a gate receiving a next sensing carry signal or one of the first through sixth carry clock signals, a first terminal connected to the sensing output node, and a second terminal receiving the second low gate voltage.

In an embodiment, the clock signals may include first, second, third, fourth, fifth and sixth scan clock signals, first, second, third, fourth, fifth and sixth sensing clock signals, and first, second, third, fourth, fifth and sixth carry clock signals. The scan carry output circuit may include a first scan transistor (e.g., SCT11) including a gate connected to the scan control node, a first terminal receiving one of the first through sixth carry clock signals, and a second terminal connected to the scan carry output node, a second scan transistor (e.g., SCT12) including a gate connected to the scan inverting node, a first terminal connected to the scan carry output node, and a second terminal receiving a first low gate voltage, and a third scan transistor (e.g., SCT13) including a gate receiving a next scan carry signal or one of the first through sixth carry clock signals, a first terminal connected to the scan carry output node, and a second terminal receiving the first low gate voltage. The sensing carry output circuit may include a first sensing transistor (e.g., SST11) including a gate connected to the sensing control node, a first terminal receiving one of the first through sixth carry clock signals, and a second terminal connected to the sensing carry output node, a second sensing transistor (e.g., SST12) including a gate connected to the sensing inverting node, a first terminal connected to the sensing carry output node, and a second terminal receiving the first low gate voltage, and a third sensing transistor (SST13) including a gate receiving a next sensing carry signal or one of the first through sixth carry clock signals, a first terminal connected to the sensing carry output node, and a second terminal receiving the first low gate voltage.

In an embodiment, the clock signals may include first, second, third, fourth, fifth and sixth scan clock signals, first, second, third, fourth, fifth and sixth sensing clock signals, and first, second, third, fourth, fifth and sixth carry clock signals. The scan discharging circuit may include a first scan transistor (e.g., SCT14) including a gate receiving a scan start signal, a first terminal connected to the scan control node, and a second terminal receiving a first low gate voltage, a second scan transistor (e.g., SCT15) including a gate receiving a next scan carry signal or one of the first through sixth carry clock signals, a first terminal connected to the scan control node, and a second terminal receiving the first low gate voltage, and a third scan transistor (e.g., SCT16) including a gate connected to the scan inverting node, a first terminal connected to the scan control node, and a second terminal receiving the first low gate voltage. The sensing discharging circuit may include a first sensing transistor (e.g., SST14) including a gate receiving the scan start signal, a first terminal connected to the sensing control node, and a second terminal receiving the first low gate voltage, a second sensing transistor (e.g., SST15) including a gate receiving a next sensing carry signal or one of the first through sixth carry clock signals, a first terminal connected to the sensing control node, and a second terminal receiving the first low gate voltage, and a third sensing transistor (e.g., SST16) including a gate connected to the sensing inverting node, a first terminal connected to the sensing control node, and a second terminal receiving the first low gate voltage.

According to an embodiment, there is provided a gate driver including first through M-th active stages configured to generate first through M-th scan signals based on first through sixth scan clock signals, to generate first through M-th sensing signals based on first through sixth sensing clock signals, and to generate first through M-th scan carry signals and first through M-th sensing carry signals based on first through sixth carry clock signals, where M is an integer greater than or equal to 4, and first through fourth back dummy stages configured to generate (M+1)-th through (M+4)-th scan carry signals and (M+1)-th through (M+4)-th sensing carry signals based on the first through fourth carry clock signals. An N-th active stage of the first through M-th active stages charges a scan control node of the N-th active stage based on an (N−3)-th scan carry signal, charges a sensing control node of the N-th active stage based on an (N−3)-th sensing carry signal, discharges the scan control node of the N-th active stage based on an (N+3)-th scan carry signal, and discharges the sensing control node of the N-th active stage based on an (N+3)-th sensing carry signal, where N is an integer greater than or equal to 1, and is less than or equal to M. The first back dummy stage charges a scan control node of the first back dummy stage based on an (M−2)-th scan carry signal, charges a sensing control node of the first back dummy stage based on an (M−2)-th sensing carry signal, discharges the scan control node of the first back dummy stage based on the (M+4)-th scan carry signal, and discharges the sensing control node of the first back dummy stage based on the (M+4)-th sensing carry signal. The second back dummy stage charges a scan control node of the second back dummy stage based on an (M−1)-th scan carry signal, charges a sensing control node of the second back dummy stage based on an (M−1)-th sensing carry signal, discharges the scan control node of the second back dummy stage based on the (M+4)-th scan carry signal, and discharges the sensing control node of the second back dummy stage based on the (M+4)-th sensing carry signal. The third back dummy stage charges a scan control node of the third back dummy stage based on the (M+1)-th scan carry signal, charges a sensing control node of the third back dummy stage based on the (M+1)-th sensing carry signal, discharges the scan control node of the third back dummy stage based on the fifth carry clock signal, and discharges the sensing control node of the third back dummy stage based on the fifth carry clock signal. The fourth back dummy stage charges a scan control node of the fourth back dummy stage based on an (M+2)-th scan carry signal, charges a sensing control node of the fourth back dummy stage based on an (M+2)-th sensing carry signal, discharges the scan control node of the fourth back dummy stage based on the sixth carry clock signal, and discharges the sensing control node of the fourth back dummy stage based on the sixth carry clock signal.

In an embodiment, the N-th active stage may discharge a scan output node and a scan carry output node of the N-th active stage based on an (N+2)-th scan carry signal, and may discharge a sensing output node and a scan carry sensing node of the N-th active stage based on an (N+2)-th sensing carry signal. The first back dummy stage may discharge a scan output node and a scan carry output node of the first back dummy stage based on an (M+3)-th scan carry signal, and may discharge a sensing output node and a scan carry sensing node of the first back dummy stage based on an (M+3)-th sensing carry signal. The second back dummy stage may discharge a scan output node and a scan carry output node of the second back dummy stage based on the (M+4)-th scan carry signal, and may discharge a sensing output node and a scan carry sensing node of the second back dummy stage based on the (M+4)-th sensing carry signal. The third back dummy stage may discharge a scan output node and a scan carry output node of the third back dummy stage based on the fifth carry clock signal, and may discharge a sensing output node and a scan carry sensing node of the third back dummy stage based on the fifth carry clock signal. The fourth back dummy stage may discharge a scan output node and a scan carry output node of the fourth back dummy stage based on the sixth carry clock signal, and may discharge a sensing output node and a scan carry sensing node of the fourth back dummy stage based on the sixth carry clock signal.

According to an embodiment, there is provided a display device including a display panel including pixels, a data driver configured to provide data voltages to the pixels, a gate driver configured to provide first through M-th gate signals to the pixels, where M is an integer greater than or equal to 4, and a controller configured to control the data driver and the gate driver. The gate driver includes M active stages configured to generate first through M-th carry signals and the first through M-th gate signals based on clock signals, and K back dummy stages configured to generate (M+1)-th through (M+K)-th carry signals based on the clock signals, where K is an integer greater than or equal to 3. An N-th active stage of the M active stages discharges a control node of the N-th active stage based on an (N+3)-th carry signal, where Nis an integer greater than or equal to 1, and is less than or equal to M. At least one back dummy stage of the K back dummy stages discharges a control node of the at least one back dummy stage based on a corresponding clock signal of the clock signals.

As described above, in a gate driver and a display device according to embodiments, at least one back dummy stage may discharge a control node and/or an output node of the back dummy stage based on a clock signal. Accordingly, the gate driver according to embodiments may be implemented without a line transferring a separate reset signal for discharging a node of the back dummy stage. Further, in a variable frame mode in which a frame frequency is changed, even if an active scan operation and a dummy scan operation are simultaneously or substantially simultaneously performed, the node of the back dummy stage of the gate driver according to embodiments may be normally discharged.

BRIEF DESCRIPTION OF THE DRAWINGS

Illustrative, non-limiting embodiments will be more clearly understood from the following detailed description in conjunction with the accompanying drawings.

DETAILED DESCRIPTION OF EMBODIMENTS

Figure 1:
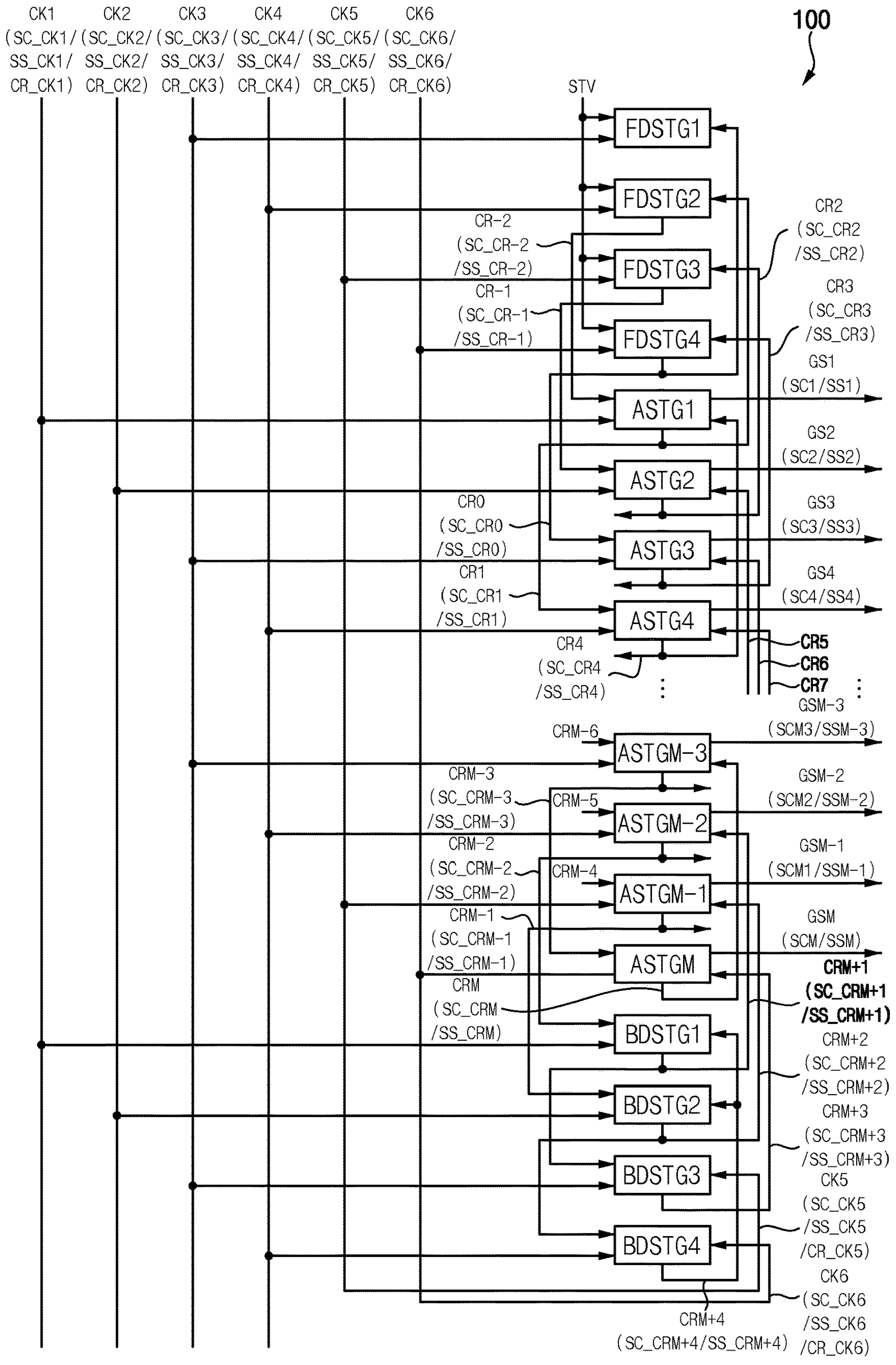
FIG. 1 is a block diagram illustrating a gate driver according to an embodiment.

The embodiments are described more fully hereinafter with reference to the accompanying drawings however, they may be embodied in different forms and should not be construed as limited to the embodiments set forth herein.

It will be understood that when an element is referred to as being "between" two elements, it can be the only element between the two elements, or one or more intervening elements may also be present. Like or similar reference numerals refer to like or similar elements throughout.

The term "about" as used herein is inclusive of the stated value and means within an acceptable range of deviation for the particular value as determined by one of ordinary skill in the art, considering the measurement in question and the error associated with measurement of the particular quantity, such as the limitations of the measurement system. For example, "about" may mean within one or more standard deviations as understood by one of the ordinary skill in the art. Further, it is to be understood that while parameters may be described herein as having "about" a certain value, according to embodiments, the parameter may be exactly the certain value or approximately the certain value within a measurement error as would be understood by a person having ordinary skill in the art.

Figure 2:
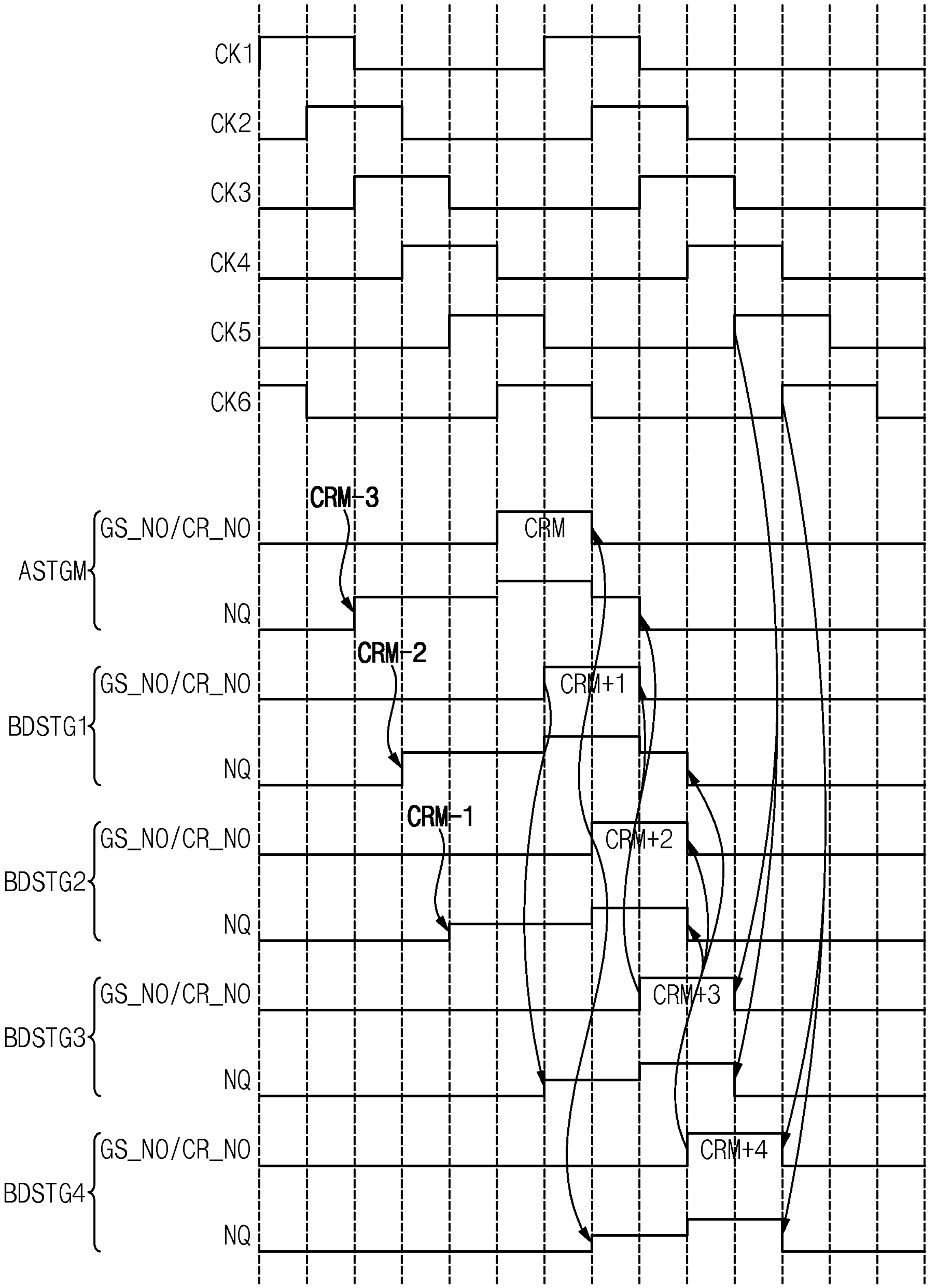
FIG. 2 is a timing diagram for describing an operation of a portion of stages of a gate driver of FIG. 1.
Figure 3:
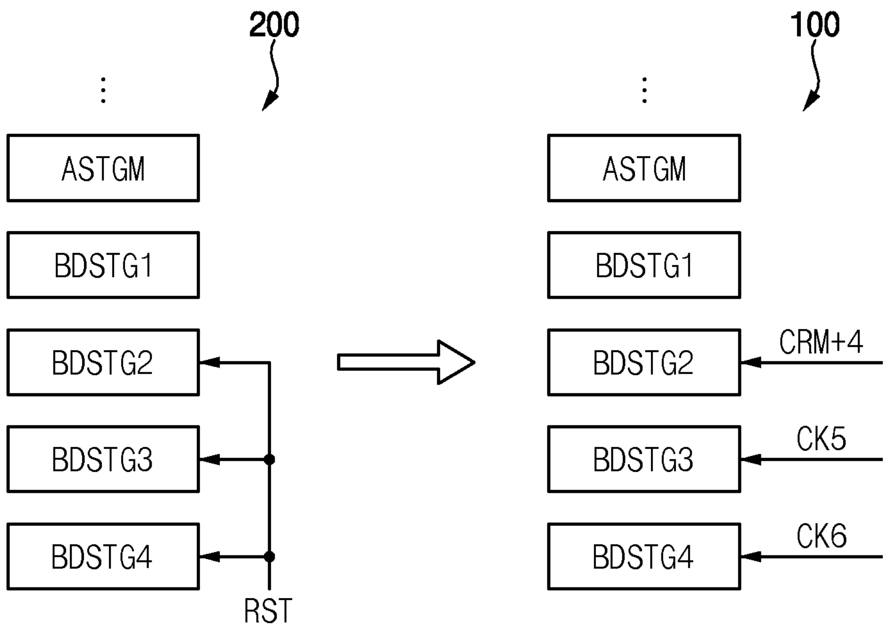
FIG. 3 is a diagram for describing a difference between a conventional gate driver and a gate driver according to an embodiment.

FIG. 1 is a block diagram illustrating a gate driver according to an embodiment, FIG. 2 is a timing diagram for describing an operation of a portion of stages of the gate driver of FIG. 1, and FIG. 3 is a diagram for describing a difference between a conventional gate driver and a gate driver according to an embodiment of the disclosure.

Referring to FIG. 1, a gate driver 100 according to an embodiment includes M active stages ASTG1, ASTG2, ASTG3, ASTG4, . . . , ASTGM-3, ASTGM-2, ASTGM-1 and ASTGM and K back (or bottom) dummy stages BDSTG1, BDSTG2, BDSTG3 and BDSTG4, where M is an integer greater than or equal to 4, and K is an integer greater than or equal to 3. In an embodiment, the gate driver 100 furthers include K front (or top) dummy stages FDSTG1, FDSTG2, FDSTG3 and FDSTG4.

The K front dummy stages FDSTG1, FDSTG2, FDSTG3 and FDSTG4 may generate carry signals CR-2, CR-1 and CR0 provided to at least some active stages ASTG1, ASTG2 and ASTG3 of the M active stages ASTG1 through ASTGM based on clock signals CK3, CK4, CK5 and CK6. In an embodiment, as illustrated in FIG. 1, K=4 and thus the gate driver 100 includes, first, second, third and fourth front dummy stages FDSTG1, FDSTG2, FDSTG3 and FDSTG4. In an embodiment, the first front dummy stage FDSTG1 charges a control node based on a scan start signal STV, charges a gate output node and a carry output node based on a voltage of the charged control node and a third clock signal CK3, and discharges the control node based on a carry signal CR0 of the fourth front dummy stage FDSTG4. In an embodiment, the second front dummy stage FDSTG2 charges a control node based on the scan start signal STV, charges a gate output node and a carry output node based on a voltage of the charged control node and a fourth clock signal CK4, and discharges the control node based on a first carry signal CR1 of a first active stage ASTG1. In an embodiment, the third front dummy stage FDSTG3 charges a control node based on the scan start signal STV, charges a gate output node and a carry output node based on a voltage of the charged control node and a fifth clock signal CK5, and discharges the control node based on a second carry signal CR2 of a second active stage ASTG2. In an embodiment, the fourth front dummy stage FDSTG4 charges a control node based on the scan start signal STV, charges a gate output node and a carry output are based on a voltage of the charged control node and a sixth clock signal CK6, and discharges the control node based on a third carry signal CR3 of a third active stage ASTG3. The gate output node and the carry output node of the first front dummy stage FDSTG1 may be discharged based on a carry signal CR-1 of the third front dummy stage FDSTG3, the gate output node and the carry output node of the second front dummy stage FDSTG2 may be discharged based on the carry signal CR0 of the fourth front dummy stage FDSTG4, the gate output node and the carry output node may be discharged based on the first carry signal CR1 of the first active stage ASTG1, and the gate output node and the carry output node of the fourth front dummy stage FDSTG4 may be discharged based on the second carry signal CR2 of the second active stage ASTG2. In an embodiment, the gate output nodes of the first through fourth front dummy stages FDSTG1 through FDSTG4 is not connected to gate lines of a Thus, even if the gate output nodes of the first through fourth front dummy stages display panel. FDSTG1 through FDSTG4 are charged, the first through fourth front dummy stages FDSTG1 through FDSTG4 do not provide gate signals to pixels of the display panel. While the carry output node of each front dummy stage is charged (e.g., to a high gate voltage), the front dummy stage may output a carry signal (e.g., having the high gate voltage) to another stage or a next stage.

The M active stages ASTG1 through ASTGM may generate first through M-th carry signals CR1, CR2, CR3, CR4, . . . , CRM and first through M-th gate signals GS1, GS2, GS3, GS4, . . . , GSM-3, GSM-2, GSM-1 and GSM based on the clock signals CK1, CK2, CK3, CK4, CK5 and CK6.

An N-th active stage of the M active stages ASTG1 through ASTGM may charge a control node of the N-th active stage based on an (N−3)-th carry signal, where N is an integer greater than or equal to 1, and is less than or equal to M. For example, the first active stage ASTG1 may charge a control node based on the carry signal CR-2 of the second front dummy stage FDSTG2, the second active stage ASTG2 may charge a control node based on the carry signal CR-1 of the third front dummy stage FDSTG3, the third active stage ASTG3 may charge a control node based on the carry signal CR0 of the fourth front dummy stage FDSTG4, and the fourth active stage ASTG4 may charge a control node based on the first carry signal CR1 of the first active stage ASTG1. Further, an (M−3)-th active stage ASTGM-3 may charge a control node based on an (M−6)-th carry signal CRM-6 of an (M−6)-th active stage, an (M−2)-th active stage ASTGM-2 may charge a control node based on an (M−5)-th carry signal CRM-5 of an (M−5)-th active stage, an (M−1)-th active stage ASTGM-1 may charge a control node based on an (M−4)-th carry signal CRM-4 of an (M−4)-th active stage, and an M-th active stage ASTGM may charge a control node based on an (M−3)-th carry signal CRM-3 of an (M−3)-th active stage ASTGM-3.

In some embodiments, the carry signals CR-2, CR-1, CR0, CR1, CR2, CR3, CR4, . . . , CRM-3, CRM-2, CRM-1, CRM, CRM+1, CRM+2, CRM+3, CRM+4 of the gate driver 100 may include scan carry signals SC_CR-2, SC_CR-1, SC_CR0, SC_CR1, SC_CR2, SC_CR3, SC_CR4, . . . , SC_CRM-3, SC_CRM-2, SC_CRM-1, SC_CRM, SC_CRM+1, SC_CRM+2, SC_CRM+3 and SC_CRM+4 and sensing carry signals SS_CR-2, SS_CR-1, SS_CR0, SS_CR1, SS_CR2, SS_CR3, SS_CR4, . . . , SS_CRM-3, SS_CRM-2, SS_CRM-1, SS_CRM, SS_CRM+1, SS_CRM+2, SS_CRM+3 and SS_CRM+4, and the control node of each stage FDSTG1 through FDSTG4, ASTG1 through ASTGM, and BDSTG1 through BDSTG4 of the gate driver 100 may include a scan control node and a sensing control node. For example, the first active stage ASTG1 may charge the scan control node based on the scan carry signal SC_CR-2 of the second front dummy stage FDSTG2, and may charge the sensing control node based on the sensing carry signal SS_CR-2 of the second front dummy stage FDSTG2. The second active stage ASTG2 may charge the scan control node based on the scan carry signal SC_CR-1 of the third front dummy stage FDSTG3, and may charge the sensing control node based on the sensing carry signal SC_CR-1 of the third front dummy stage FDSTG3. The third active stage ASTG3 may charge the scan carry signal SC_CR0 of the fourth front dummy stage FDSTG4, and may charge the sensing control node based on the sensing carry signal SS_CR0 of the fourth front dummy stage FDSTG4. The fourth active stage ASTG4 may charge the scan control node based on the first scan carry signal SC_CR1 of the first active stage ASTG1, and may charge the sensing control node based on the first sensing carry signal SS_CR1 of the first active stage ASTG1. Further, the M-th active stage ASTGM may charge the scan control node based on the (M−3)-th scan carry signal SC_CRM-3 of the (M−3)-th active stage ASTGM-3, and may charge the sensing control node based on the (M−3)-th sensing carry signal SS_CRM-3 of the (M−3)-th active stage ASTGM-3.

Further, the N-th active stage may charge a gate output node and a carry output node based on a voltage of the charged control node and a corresponding clock signal. For example, the first active stage ASTG1 may charge the gate output node and the carry output node based on the voltage of the charged control node and the first clock signal CK1, the second active stage ASTG2 may charge the gate output node and the carry output node based on the voltage of the charged control node and the second clock signal CK2, the third active stage ASTG3 may charge the gate output node and the carry output node based on the voltage of the charged control node and the third clock signal CK3, and the fourth active stage ASTG4 may charge the gate output node and the carry output node based on the voltage of the charged control node and the fourth clock signal CK4. Further, the (M−3)-th active stage ASTGM-3 may charge the gate output node and the carry output node based on the voltage of the charged control node and the third clock signal CK3, the (M−2)-th active stage ASTGM-2 may charge the gate output node and the carry output node based on the voltage of the charged control node and the fourth clock signal CK4, the (M−1)-th active stage ASTGM-1 may charge the gate output node and the carry output node based on the voltage of the charged control node and the fifth clock signal CK5, and the M-th active stage ASTGM may charge the voltage of the charged control node and the sixth clock signal CK6. In an embodiment, the gate output nodes of the M active stages ASTG1 through ASTGM are connected to respective gate lines of the display panel, and the M active stages ASTG1 through ASTGM provide corresponding gate signals GS1, GS2, GS3, GS4, . . . , GSM-3, GSM-2, GSM-1 and GSM to the pixels connected to the gate lines.

In some embodiments, the clock signals CK1, CK2, CK3, CK4, CK5 and CK6 of the gate driver 100 may include first, second, third, fourth and sixth scan clock signals SC_CK1, SC_CK2, SC_CK3, SC_CK4, SC_CK5 and SC_CK6, first, second, third, fourth and sixth sensing clock signals SS_CK1, SS_CK2, SS_CK3, SS_CK4, SS_CK5 and SS_CK6, and first, second, third, fourth and sixth carry clock signals CR_CK1, CR_CK2, CR_CK3, CR_CK4, CR_CK5 and CR_CK6, the gate output node of each stage FDSTG1 through FDSTG4, ASTG1 through ASTGM, and BDSTG1 through BDSTG4 of the gate driver 100 may include a scan output node and a sensing output node, and the carry output node of each stage FDSTG1 through FDSTG4, ASTG1 through ASTGM, and BDSTG1 through BDSTG4 of the gate driver 100 may include a scan carry output node and a sensing carry output node. For example, the first active stage ASTG1 may charge the scan output node based on a voltage of the charged scan control node and the first scan clock signal SC_CK1, may charge the sensing output node based on a voltage of the charged sensing control node and the first sensing clock signal SS_CK1, may charge the scan carry output node based on the voltage of the charged scan control node and the first carry clock signal CR_CK1, and may charge the sensing carry output node based on the voltage of the charged sensing control node and the first carry clock signal CR_CK1. Similarly, the M-th active stage ASTGM may charge the scan output node based on a voltage of the charged scan control node and the sixth scan clock signal SC_CK6, may charge the sensing output node based on a voltage of the charged sensing control node and the sensing clock signal SS_CK6, may charge the scan carry output node based on the voltage of the charged scan control node and the sixth carry clock signal CR_CK6, and may charge the sensing carry output node based on the voltage of the charged sensing control node and the sixth carry clock signal CR_CK6. Further, the scan output nodes of the first through M-th active stages ASTG1 through ASTGM may be connected to scan signal lines of the display panel as the gate lines, and the first through M-th active stages ASTG1 through ASTGM may provide first through M-th scan signals SC1, SC2, SC3, SC4, . . . , SCM-3, SCM-2, SCM-1 and SCM to the pixels of the display panel. In addition, the sensing output nodes of the first through M-th active stages ASTG1 through ASTGM may be connected to sensing signal lines of the display panel as the gate lines, and the first through M-th active stages ASTG1 through ASTGM may provide first through M-th sensing signals SS1, SS2, SS3, SS4, . . . , SSM-3, SSM-2, SSM-1 and SSM to the pixels of the display panel.

Further, the N-th active stage may discharge the gate output node and the carry output node of the N-th active stage based on an (N+2)-th carry signal. The first active stage ASTG1 may discharge the gate output node and the carry output node based on the third carry signal CR3, the second active stage ASTG2 may discharge the gate output node and the carry output node based on a fourth carry signal CR4, the third active stage ASTG3 may discharge the gate output node and the carry output node based on a fifth carry signal CR5, the fourth active stage ASTG4 may discharge the gate output node and the carry output node based on a sixth carry signal CR6. Further, the (M−3)-th active stage ASTGM-3 may discharge the gate output node and the carry output node based on an (M−1)-th carry signal CRM-1, the (M−2)-th active stage ASTGM-2 may discharge the gate output node and the carry output node based on the M-th carry signal CRM, the (M−1)-th active stage ASTGM-1 may discharge the gate output node and the carry output node based on an (M+1)-th carry signal CRM+1, and the M-th active stage ASTGM may discharge the gate output node and the carry output node based on an (M+2)-th carry signal CRM+2.

In an embodiment, the first active stage ASTG1 discharges the scan output node and the scan carry output node based on the third scan carry signal SC_CR3, and discharges the sensing output node and the sensing carry output node based on the third sensing carry signal SS_CR3. Similarly, the M-th active stage ASTGM may discharge the scan output node and the scan carry output node based on an (M+2)-th scan carry signal SC_CRM+2, and may discharge the sensing output node and the sensing carry output node based on an (M+2)-th sensing carry signal SS_CRM+2.

Further, the N-th active stage may discharge the control node of the N-th active stage based on the (N+3)-th carry signal. For example, as illustrated in FIG. 1, the first active stage ASTG1 may discharge the control node based on the fourth carry signal CR4, the second active stage ASTG2 may discharge the control node based on the fifth carry signal CR5, the third active stage ASTG3 may discharge the control node based on the sixth carry signal CR6, and the fourth active stage ASTG4 may discharge the control node based on a seventh carry signal CR7. In addition, the (M−3)-th active stage ASTGM-3 may discharge the control node based on the M-th carry signal CRM, the (M−2)-th active stage ASTGM-2 may discharge the (M+1)-th carry signal CRM+1, the (M−1)-th active stage ASTGM-1 may discharge the control node based on the (M+2)-th carry signal CRM+2, the (M−1)-th active stage ASTGM-1 may discharge the control node based on the (M+2)-th carry signal CRM+2, and the M-th active stage ASTGM may discharge the control node based on an (M+3)-th carry signal CRM+3.

In an embodiment, the first active stage ASTG1 discharges the scan control node based on a fourth scan carry signal SC_CR4, and discharges the sensing control node based on a fourth sensing carry signal SS_CR4. Similarly, the M-th active stage ASTGM may discharge the scan control node based on an (M+3)-th scan carry signal SC_CRM+3, and may discharge the sensing control node based on an (M+3)-th sensing carry signal SS_CRM+3.

The K back or bottom dummy stages BDSTG1, BDSTG2, BDSTG3 and BDSTG4 may generate the (M+1)-th through (M+K)-th carry signals CRM+1, CRM+2, CRM+3 and CRM+4 based on the clock signals CK1, CK2, CK3 and CK4. In an embodiment where K=4, as illustrated in FIG. 1, the gate driver 100 includes first, second, third and fourth back dummy stages BDSTG1, BDSTG2, BDSTG3 and BDSTG4 that respectively generate the (M+1)-th, (M+2)-th, (M+3)-th and (M+4)-th carry signals CRM+1, CRM+2, CRM+3 and CRM+4.

Unlike the active stages ASTG1 through ASTGM in which the N-th active stage charges the control node based on the (N−3)-th carry signal, at least one L-th back dummy stage charges a control node of the L-th back dummy stage based on an (L−2)-th carry signal, where L is an integer greater than or equal to 3, and is less than or equal to K. For example, as illustrated in FIGS. 1 and 2, similar to the active stages ASTG1 through ASTGM, the first back dummy stage BDSTG1 may charge the control node NQ based on an (M−2)-th carry signal CRM-2 of the (M−2)-th active stage ASTGM-2, and the second back dummy stage BDSTG2 may charge the control node NQ based on the (M−1)-th carry signal CRM-1 of the (M−1)-th active stage ASTGM-1. However, unlike the active stages ASTG1 through ASTGM, the third back dummy stage BDSTG3 charge the control node NQ based on the (M+1)-th carry signal CRM+1 of the first back dummy stage BDSTG1, and the fourth back dummy stage BDSTG4 charges the control node NQ based on the (M+2)-th carry signal CRM+2 of the second back dummy stage BDSTG2. Since the control node NQ of the third back dummy stage BDSTG3 is charged based on the (M+1)-th carry signal CRM+1 that does not overlap with the fifth clock signal CK5 instead of the M-th carry signal CRM that partially overlaps the fifth clock signal CK5, as will be described below, the fifth clock signal CK5 may be used to discharge the control node NQ of the third back dummy stage BDSTG3. For example, the (M+1)-th carry signal CRM+1 not overlapping with the fifth clock signal CK5 may mean that a logical high of the M+1)-th carry signal CRM+1 does not overlap in time with a logic high of the fifth clock signal CK5. Further, since the control node NQ of the fourth back dummy stage BDSTG4 is charged based on the (M+2)-th carry signal CRM+2 that does not overlap with the sixth clock signal CK6 instead of the (M+1)-th carry signal CRM+1 that partially overlaps the sixth clock signal CK6, as will be described below, the sixth clock signal CK6 may be used to discharge the control node NQ of the fourth back dummy stage BDSTG4.

In an embodiment, the control node NQ includes the scan control node and the sensing control node. For example, the first back dummy stage BDSTG1 may charge the scan control node based on an (M−2)-th scan carry signal SC_CRM-2 of the (M−2)-th active stage ASTGM-2 that is its third previous stage, and may charge the sensing control node based on an (M−2)-th sensing carry signal SS_CRM-2 of the (M−2)-th active stage ASTGM-2. The second back dummy stage BDSTG2 may charge the scan control node based on an (M−1)-th scan carry signal SC_CRM-1 of the (M−1)-th active stage ASTGM-1 that is its third previous stage, and may charge the sensing control node based on an (M−1)-th sensing carry signal SS_CRM-1 of the (M−1)-th active stage ASTGM-1. However, the third back dummy stage BDSTG3 may charge the scan control node based on an (M+1)-th scan carry signal SC_CRM+1 of the first back dummy stage BDSTG1 that is its second previous stage, and may charge the sensing control node based on an (M+1)-th sensing carry signal SS_CRM+1 of the back dummy stage BDSTG1. The fourth back dummy stage BDSTG4 may charge the scan control node based on an (M+2)-th scan carry signal SC_CRM+2 of the second back dummy stage BDSTG2 that is its second previous stage, and may charge the sensing control node based on an (M+2)-th sensing carry signal SS_CRM+2 of the second back dummy stage BDSTG2.

Further, the first through fourth back dummy stages BDSTG1 through BDSTG4 may charge gate output nodes and carry output nodes based on voltages of the charged control nodes of the first through fourth back dummy stages BDSTG1 through BDSTG4 and the first through fourth clock signals CK1 through CK4. For example, as illustrated in FIGS. 1 and 2, the first back dummy stage BDSTG1 may charge the gate output node GS_NO and the carry output node CR_NO based on the voltage of the charged control node NQ of the first back dummy stage BDSTG1 and the first clock signal CK1, the second back dummy stage BDSTG2 may charge the gate output node GS_NO and the carry output node CR_NO based on the voltage of the charged control node NQ of the second back dummy stage BDSTG2 and the second clock signal CK2, the third back dummy stage BDSTG3 may charge the gate output node GS_NO and the carry output node CR_NO based on the voltage of the charged control node NQ of the third back dummy stage BDSTG3 and the third clock signal CK3, and the fourth back dummy stage BDSTG4 may charge the gate output node GS_NO and the carry output node CR_NO based on the voltage of the charged control node NQ of the fourth back dummy stage BDSTG4 and the fourth clock signal CK4. In an embodiment, the gate output nodes GS_NO of the first through fourth back dummy stages BDSTG1 through BDSTG4 are not connected to the gate lines of the display panel. Thus, even if the gate output nodes of the first through fourth back dummy stages BDSTG1 through BDSTG4 are charged, the first through fourth back dummy stages BDSTG1 through BDSTG4 do not provide gate signals to the pixels of the display panel. While the carry output node of each back dummy stage is charged (e.g., to the high gate voltage), the back dummy stage may output a carry signal (e.g., having the high gate voltage) to another stage or a next stage. For example, the first back dummy stage BDSTG1 may output the (M+1)-th carry signal CRM+1 having a high level while the carry output node CR_NO of the first back dummy stage BDSTG1 is charged, the second back dummy stage BDSTG2 may output the (M+2)-th carry signal CRM+2 having the high level while the carry output node CR_NO of the second back dummy stage BDSTG2 is charged, the third back dummy stage BDSTG3 may output the (M+3)-th carry signal CRM+3 having the high level while the carry output node CR_NO of the third back dummy stage BDSTG3 is charged, and the fourth back dummy stage BDSTG4 may output the (M+4)-th carry signal CRM+4 having the high level while the carry output node CR_NO of the fourth back dummy stage BDSTG4 is charged.

In an embodiments, the gate output node GS_NO includes the scan output node and the sensing output node, and the carry output node CR_NO includes the scan carry output node and the sensing carry output node. For example, the first back dummy stage BDSTG1 may charge the scan output node based on a voltage of the charged scan control node and the first scan clock signal SC_CK1, may charge the sensing output node based on a voltage of the charged sensing control node and the first sensing clock signal SS_CK1, may charge the scan carry output node based on the voltage of the charged scan control node and the first carry clock signal CR_CK1, and may charge the sensing carry output node based on the voltage of the charged sensing control node and the first carry clock signal CR_CK1. The second back dummy stage BDSTG2 may charge the scan output node based on a voltage of the charged scan control node and the second scan clock signal SC_CK2, may charge the sensing output node based on a voltage of the charged sensing control node and the second sensing clock signal SS_CK2, may charge the scan carry output node based on the voltage of the charged scan control node and the second carry clock signal CR_CK2, and may charge the sensing carry output node based on the voltage of the charged sensing control node and the second carry clock signal CR_CK2. The third back dummy stage BDSTG3 may charge the scan output node based on a voltage of the charged scan control node and the third scan clock signal SC_CK3, may charge the sensing output node based on a voltage of the charged sensing control node and the third sensing clock signal SS_CK3, may charge the scan carry output node based on the voltage of the charged scan control node and the third carry clock signal CR_CK3, and may charge the sensing carry output node based on the voltage of the charged sensing control node and the third carry clock signal CR_CK3. The fourth back dummy stage BDSTG4 may charge the scan output node based on a voltage of the charged scan control node and the fourth scan clock signal SC_CK4, may charge the sensing output node based on a voltage of the charged sensing control node and the fourth sensing clock signal SS_CK4, may charge the scan carry output node based on the voltage of the charged scan control node and the fourth carry clock signal CR_CK4, and may charge the sensing carry output node based on the voltage of the charged sensing control node and the fourth carry clock signal CR_CK4. In an embodiment, the scan output nodes and the sensing output nodes of the first through fourth back dummy stages BDSTG1 through BDSTG4 are not connected to the gate lines (i.e., the scan signal lines and the sensing signal lines) of the display panel.

Unlike the active stages ASTG1 through ASTGM in which the N-th active stage discharges the gate output node GS_NO and the carry output node CR_NO based on the (N+2)-th carry signal, at least one L-th back dummy stage discharges the gate output node GS_NO and the carry output node CR_NO of the L-th back dummy stage based on a corresponding clock signal. For example, as illustrated in FIG. 2, similar to the active stages ASTG1 through ASTGM, the first back dummy stage BDSTG1 may discharge the gate output node GS_NO and the carry output node CR_NO based on the (M+3)-th carry signal CRM+3 of the third back dummy stage BDSTG3, and the second back dummy stage BDSTG2 may discharge the gate output node GS_NO and the carry output node CR_NO based on the (M+4)-th carry signal CRM+4 of the fourth back dummy stage BDSTG4. However, unlike the active stages ASTG1 through ASTGM, the third back dummy stage BDSTG3 discharges the gate output node GS_NO and the carry output node CR_NO based on the fifth clock signal CK5, and the fourth back dummy stage BDSTG4 discharges the gate output node GS_NO and the carry output node CR_NO based on the sixth clock signal CK6. As illustrated in FIG. 3, in a conventional gate driver 200, a separate reset signal RST is used to discharge gate output nodes and carry output nodes of third and fourth back dummy stages BDSTG3 and BDSTG4. However, in the gate driver 100 according to an embodiment, since the clock signals CK5 and CK6 are used to discharge the gate output nodes GS_NO and the carry output nodes CR_NO of the third and fourth back dummy stages BDSTG3 and BDSTG4, the gate driver 100 may be implemented without a line transferring the separate reset signal RST. Further, in the conventional gate driver 200, the separate reset signal RST needs to be applied at an appropriate time or with appropriate timing. However, in the gate driver 100 according to an embodiment, since the clock signals CK5 and CK6 having predetermined timings are used, the possibility of a malfunction of the gate driver 100 may be reduced.

In an embodiments, the gate output node GS_NO includes the scan output node and the sensing output node, and the carry output node CR_NO includes the scan carry output node and the sensing carry output node. For example, the first back dummy stage BDSTG1 may discharge the scan output node and the scan carry output node based on the (M+3)-th scan carry signal SC_CRM+3 of the third back dummy stage BDSTG3, and may discharge the sensing output node and the sensing carry output node based on the (M+3)-th sensing carry signal SS_CRM+3 of the third back dummy stage BDSTG3. The second back dummy stage BDSTG2 may discharge the scan output node and the scan carry output node based on an (M+4)-th scan carry signal SC_CRM+4 of the fourth back dummy stage BDSTG4, and may discharge the sensing output node and the sensing carry output node based on an (M+4)-th sensing carry signal SS_CRM+4 of the fourth back dummy stage BDSTG4. In some embodiments, the scan output nodes, the sensing output nodes, the scan carry output nodes and the sensing carry output nodes of the third and fourth back dummy stages BDSTG3 and BDSTG4 may be discharged based on the carry clock signals CR_CK5 and CR_CK6. For example, the scan output node, the sensing output node, the scan carry output node and the sensing carry output node of the third back dummy stage BDSTG3 may be discharged based on the fifth carry clock signal CR_CK5, and the scan output node, the sensing output node, the scan carry output node and the sensing carry output node of the fourth back dummy stage BDSTG4 may be discharged based on the sixth carry clock signal CR_CK6. In other embodiments, the scan clock signals SC_CK5 and SC_CK6 and/or the sensing clock signals SS_CK5 and SS_CK6 may be used to discharge the gate output nodes GS_NO and the carry output nodes CR_NO of the third and fourth back dummy stages BDSTG3 and BDSTG4 instead of the carry clock signals CR_CK5 and CR_CK6 (or along with the carry clock signals CR_CK5 and CR_CK6). For example, the third back dummy stage BDSTG3 may discharge the scan output node and the scan carry output node based on the fifth scan clock signal SC_CK5, and may discharge the sensing output node and the sensing carry output node based on the fifth sensing clock signal SS_CK5. The fourth back dummy stage BDSTG4 may discharge the scan output node and the scan carry output node based on the sixth scan clock signal SC_CK6, and may discharge the sensing output node and the sensing carry output node based on the sixth sensing clock signal SS_CK6.

Further, unlike the active stages ASTG1 through ASTGM in which the N-th active stage discharges the control node NQ based on the (N+3)-th carry signal, at least one L-th back dummy stage may discharge the control node NQ of the L-th back dummy stage based on an (L+2)-th carry signal or a corresponding clock signal. For example, as illustrated in FIGS. 1 and 2, similar to the active stages ASTG1 through ASTGM, the first back dummy stage BDSTG1 may discharge the control node NQ based on the (M+4)-th carry signal CRM+4 of the fourth back dummy stage BDSTG4. However, unlike the active stages ASTG1 through ASTGM, the second back dummy stage BDSTG2 may discharge the control node NQ based on the (M+4)-th carry signal CRM+4 of the fourth back dummy stage BDSTG4. Further, unlike the active stages ASTG1 through ASTGM, the third back dummy stage BDSTG3 may discharge the control node NQ based on the fifth clock signal CK5, and the fourth back dummy stage BDSTG4 may discharge the control node NQ based on the sixth clock signal CK6. As illustrated in FIG. 3, in the conventional gate driver 200, the separate reset signal RST is used to discharge control nodes NQ of second, third and fourth back dummy stages BDSTG2, BDSTG3 and BDSTG4. However, in the gate driver 100 according to an embodiment, the control node NQ of the second back dummy stage BDSTG2 is discharged based on the (M+4)-th carry signal CRM+4, the control node NQ of the third back dummy stage BDSTG3 is discharged based on the fifth clock signal CK5, and the control node NQ of the fourth back dummy stage BDSTG4 is discharged based on the sixth clock signal CK6. Thus, the gate driver 100 according to an embodiments may be implemented without the line transferring the separate reset signal RST. In addition, in the conventional gate driver 200, the separate reset signal RST needs be applied at an appropriate time or with appropriate timing. However, in the gate driver 100 according to an embodiments, since the clock signals CK5 and CK6 having predetermined timings are used instead of the separate reset signal RST, the possibility of a malfunction of the gate driver 100 may be reduced.

In an embodiment, the control node NQ includes the scan control node and the sensing control node. For example, the first back dummy stage BDSTG1 may discharge the scan control node based on the (M+4)-th scan carry signal SC_CRM+4 of the fourth back dummy stage BDSTG4, and may discharge the sensing control node based on the (M+4)-th sensing carry signal SS_CRM+4 of the fourth back dummy stage BDSTG4. The second back dummy stage BDSTG2 may discharge the scan control node based on the (M+4)-th scan carry signal SC_CRM+4 of the fourth back dummy stage BDSTG4, and may discharge the sensing control node based on the (M+4)-th sensing carry signal SS_CRM+4 of the fourth back dummy stage BDSTG4. Further, in some embodiments, the scan control nodes and the sensing control nodes of the third and fourth back dummy stages BDSTG3 and BDSTG4 may be discharged based on the carry clock signals CR_CK5 and CR_CK6. For example, the scan control node and the sensing control node of the third back dummy stage BDSTG3 may be discharged based on the fifth carry clock signal CR_CK5, and the scan control node and the sensing control node of the fourth back dummy stage BDSTG4 may be discharged based on the sixth carry clock signal CR_CK6. In other embodiments, the scan clock signals SC_CK5 and SC_CK6 and/or the sensing clock signals SS_CK5 and SS_CK6 may be used to discharge the scan control nodes and the sensing control nodes of the third and fourth back dummy stages BDSTG3 and BDSTG4 instead of the carry clock signals CR_CK5 and CR_CK6 (or along with the carry clock signals CR_CK5 and CR_CK6). For example, the third back dummy stage BDSTG3 may discharge the scan control node based on the fifth scan clock signal SC_CK5 and may discharge the sensing control node based on the fifth sensing clock signal SS_CK5. The fourth back dummy stage BDSTG4 may discharge the scan control node based on the sixth scan clock signal SC_CK6, and may discharge the sensing control node based on the sixth sensing clock signal SS_CK6.

As described above, in the gate driver 100 according to an embodiment, at least one back dummy stage BDSTG3 and BDSTG4 may discharge the control node NQ, the gate output node GS_NO and/or the carry output node CR_NO based on the clock signals CK5 and CK6. Accordingly, the gate driver 100 according to an embodiment may be implemented without the line transferring the separate reset signal RST. In addition, as will be described later with reference to FIGS. 12 through 17, even if an active scan operation and a dummy scan operation are simultaneously performed in a variable frame mode in which a frame frequency is changed, the gate driver 100 according to an embodiment may normally discharge the nodes of the back dummy stages BDSTG3 and BDSTG4.

Figure 4:
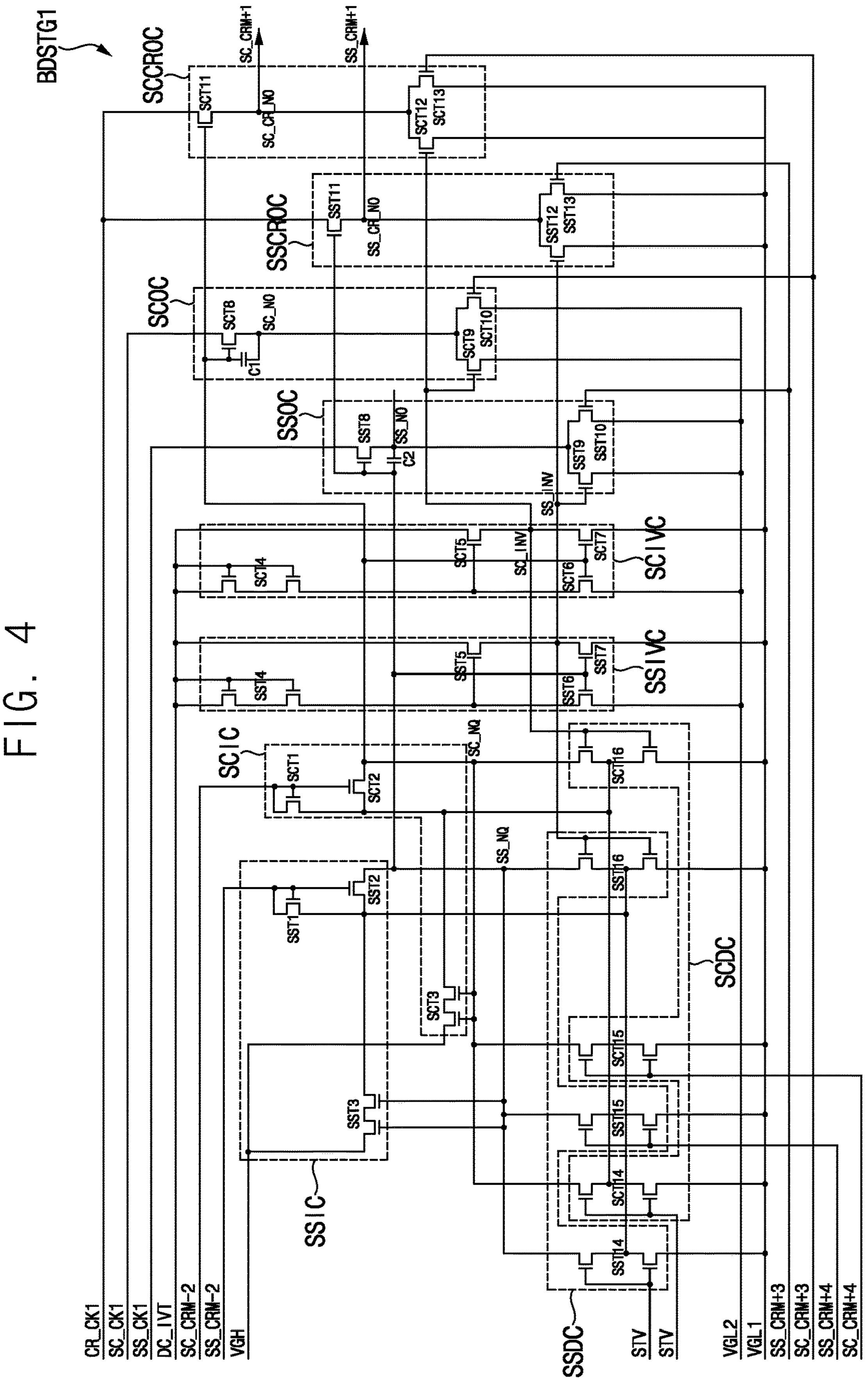
FIG. 4 is a circuit diagram illustrating an example of a first back dummy stage.

FIG. 4 is a circuit diagram illustrating an example of a first back dummy stage (e.g., BDSTG1).

Referring to FIG. 4, a first back dummy stage BDSTG1 includes a scan input circuit SCIC, a sensing input circuit SSIC, a scan inverting circuit SCIVC, a sensing inverting circuit SSIVC, a scan output circuit SCOC, a sensing output circuit SSOC, a scan carry output circuit SCCROC, a sensing carry output circuit SSCROC, a scan discharging circuit SCDC and a sensing discharging circuit SSDC.

The scan input circuit SCIC may charge a scan control node SC_NQ based on a previous scan carry signal. The sensing input circuit SSIC may also charge a sensing control node SS_NQ based on a previous sensing carry signal. The scan input circuit SCIC of the first back dummy stage BDSTG1 may charge the scan control node SC_NQ of the back dummy stage BDSTG1 in response to an (M−2)-th scan carry signal SC_CRM-2 generated by an (M−2)-th active stage as the previous scan carry signal, and the sensing input circuit SSIC of the first back dummy stage BDSTG1 may charge the sensing control node SS_NQ of the first back dummy stage BDSTG1 in response to an (M−2)-th sensing carry signal SS_CRM-2 of the (M−2)-th active stage as the previous sensing carry signal. For example, the scan input circuit SCIC may include first, second and third scan transistors SCT1, SCT2 and SCT3 that transfer the (M−2)-th scan carry signal SC_CRM-2 having a high level and a high gate voltage VGH when the (M−2)-th scan carry signal SC_CRM-2 has the high level, and the sensing input circuit SSIC may include first, second and third sensing transistors SST1, SST2 and SST3 that transfer the (M−2)-th sensing carry signal SS_CRM-2 having the high level and the high gate voltage VGH to the sensing control node SS_NQ when the (M−2)-th sensing carry signal SS_CRM-2 has the high level. In some embodiments, the first scan transistor SCT1 may include a gate receiving the previous scan carry signal (e.g., the (M−2)-th scan carry signal SC_CRM-2), a first terminal receiving the previous scan carry signal, and a second terminal, the second scan transistor SCT2 may include a gate receiving the previous scan carry signal, a first terminal connected to the second terminal of the first scan transistor SCT1, and a second terminal connected to the scan control node SC_NQ, and the third scan transistor SCT3 may include a gate connected to the scan control node SC_NQ, a first terminal receiving the high gate voltage VGH, and a second terminal connected to the first terminal of the second scan transistor SCT2. Further, the first sensing transistor SST1 may include a gate receiving the previous sensing carry signal (e.g., the (M−2)-th sensing carry signal SS_CRM-2), a first terminal receiving the previous sensing carry signal, and a second terminal, the second sensing transistor SST2 may include a gate receiving the previous sensing carry signal, a first terminal connected to the second terminal of the first sensing transistor SST1, and a second terminal connected to the sensing control node SS_NQ, and the third sensing transistor SST3 may include a gate connected to the sensing control node SS_NQ, a first terminal receiving the high gate voltage VGH, and a second terminal connected to the first terminal of the second sensing transistor SST2.

The scan inverting circuit SCIVC may control a voltage of the scan inverting node SC_INV based on a voltage of the scan control node SC_NQ. The sensing inverting circuit SSIVC may control a voltage of a sensing inverting node SS_INV based on a voltage of the sensing control node SS_NQ. For example, the scan inverting circuit SCIVC may include fourth and fifth scan transistors SCT4 and SCT5 that are turned on to provide a direct current (DC) voltage DC_IVT to the scan inverting node SC_INV while the scan control node SC_NQ is discharged to a low level. The scan inverting circuit SCIVC may further include sixth and seventh scan transistors SCT6 and SCT7 that are turned on to prevent the fifth scan transistor SCT5 from being turned on and to provide a first low gate voltage VGL1 to the scan inverting node SC_INV while the scan control node SC_NQ is charged to the high level. Further, the sensing inverting circuit SSIVC may include fourth and fifth sensing transistors SST4 and SST5 that are turned on to provide the DC voltage DC_IVT to the sensing inverting node SS_INV while the sensing control node SS_NQ is discharged to the low level. The sensing inverting circuit SSIVC may further include sixth and seventh sensing transistors SST6 and SST7 that are turned on to prevent the fifth sensing transistor SST5 from being turned on and to provide the first low gate voltage VGL1 to the sensing inverting node SS_INV while the sensing control node SS_NQ is charged to the high level. In some embodiments, the fourth scan transistor SCT4 may include a gate receiving the DC voltage DC_IVT, a first terminal receiving the DC voltage DC_IVT, and a second terminal, the fifth scan transistor SCT5 may include a gate connected to the second terminal of the fourth scan transistor SCT4, a first terminal receiving the DC voltage DC_IVT, and a second terminal connected to the scan inverting node SC_INV. In some embodiments, the sixth scan transistor SCT6 may include a gate connected to the scan control node SC_NQ, a first terminal connected to the gate of the fifth scan transistor SCT5, and a second terminal receiving a second low gate voltage VGL2. In some embodiments, the seventh scan transistor SCT6 may include a gate connected to the scan control node SC_NQ, a first terminal connected to the scan inverting node SC_INV, and a second terminal receiving the first low gate voltage VGL1. Further, the fourth sensing transistor SST4 may include a gate receiving the DC voltage DC_IVT, a first terminal receiving the DC voltage DC_IVT, and a second terminal. The fifth sensing transistor SST5 may include a gate connected to the second terminal of the fourth sensing transistor SST4, a first terminal receiving the DC voltage DC_IVT, and a second terminal connected to the sensing inverting node SS_INV. The sixth sensing transistor SST6 may include a gate connected to the sensing control node SS_NQ, a first terminal connected to the gate of the fifth sensing transistor SST5, and a second terminal receiving the second low gate voltage VGL2. The seventh sensing transistor SST7 may include a gate connected to the sensing control node SS_NQ, a first terminal connected to the sensing inverting node SS_INV, and a second terminal receiving the first low gate voltage VGL1. In an embodiment, the first low gate voltage VGL1 is lower than the second low gate voltage VGL2. For example, the first low gate voltage VGL1 may be, but is not limited to, about-9V, and the second low gate voltage VGL2 may be, but is not limited to, about-5V. Further, the DC voltage DC_IVT may be, but is not limited to, a constant voltage of about 15V.

The scan output circuit SCOC may control a scan output node SC_NO based on the voltage of the scan control node SC_NQ and the voltage of the scan inverting node SC_INV. The sensing output circuit SSOC may control a sensing output node SS_NO based on the voltage of the sensing control node SS_NQ and the voltage of the sensing inverting node SS_INV. The scan output circuit SCOC of the first back dummy stage BDSTG1 may charge the scan output node SC_NO to the high level when the scan control node SC_NQ is charged and a first scan clock signal SC_CK1 has the high level, and may discharge the scan output node SC_NO to the second low gate voltage VGL2 when the voltage of the scan inverting node SC_INV has the high level or an (M+3)-th scan carry signal SC_CRM+3 has the high level. Further, the sensing output circuit SSOC of the first back dummy stage BDSTG1 may charge the sensing output node SS_NO to the high level when the sensing control node SS_NQ is charged and a first sensing clock signal SS_CK1 has the high level, and may discharge the sensing output node SS_NO to the second low gate voltage VGL2 when the voltage of the sensing inverting node SS_INV has the high level or an (M+3)-th sensing carry signal SS_CRM+3 has the high level. For example, the scan output circuit SCOC may include a first capacitor C1 and an eighth scan transistor SCT8 that boost the voltage of the scan control node SC_NQ and charge the scan output node SC_NO when the scan control node SC_NQ is charged and the first scan clock signal SC_CK1 has the high level. The scan output circuit SCOC may further include a ninth scan transistor SCT9 that discharges the scan output node SC_NO when the voltage of the scan inverting node SC_INV has the high level, and may further include a tenth scan transistor SCT10 that discharges the scan output node SC_NO when the (M+3)-th scan carry signal SC_CRM+3 has the high level. Further, the sensing output circuit SSOC may include a second capacitor C2 and an eighth sensing transistor SST8 that boost the voltage of the sensing control node SS_NQ and charge the sensing output node SS_NO when the sensing control node SS_NQ is charged and the first sensing clock signal SS_CK1 has the high level. The sensing output circuit SSOC may further include a ninth sensing transistor SST9 that discharges the sensing output node SS_NO when the voltage of the sensing inverting node SS_INV has the high level, and may further include a tenth sensing transistor SST10 that discharges the sensing output node SS_NO when the (M+3)-th sensing carry signal SS_CRM+3 has the high level. In some embodiments, the eighth scan transistor SCT8 may include a gate connected to the scan control node SC_NQ, a first terminal receiving the first scan clock signal SC_CK1, and a second terminal connected to the scan output node SC_NO. The first capacitor C1 may include a first electrode connected to the scan control node SC_NQ and a second electrode connected to the scan output node SC_NO. The ninth scan transistor SCT9 may include a gate connected to the scan inverting node SC_INV, a first terminal connected to the scan output node SC_NO, and a second terminal receiving the second low gate voltage VGL2. The tenth scan transistor SCT10 may include a gate receiving the (M+3)-th scan carry signal SC_CRM+3, a first terminal connected to the scan output node SC_NO, and a second terminal receiving the second low gate voltage VGL2. Further, the eighth sensing transistor SST8 may include a gate connected to the sensing control node SS_NQ, a first terminal receiving the first sensing clock signal SS_CK1, and a second terminal connected to the sensing output node SS_NO. The second capacitor C2 may include a first electrode connected to the sensing control node SS_NQ and a second electrode connected to the sensing output node SS_NO. The ninth sensing transistor SST9 may include a gate connected to the sensing inverting node SS_INV, a first terminal connected to the sensing output node SS_NO, and a second terminal receiving the second low gate voltage VGL2. The tenth sensing transistor SST10 may include a gate receiving the (M+3)-th scan carry signal SC_CRM+3, a first terminal connected to the sensing output node SS_NO, and a second terminal receiving the second low gate voltage VGL2.

The scan carry output circuit SCCROC may control a scan carry output node SC_CR_NO based on the voltage of the scan control node SC_NQ and the voltage of the scan inverting node SC_INV. The sensing carry output circuit SSCROC may control a sensing carry output node SS_CR_NO based on the voltage of the sensing control node SS_NQ and the voltage of the sensing inverting node SS_INV. The scan carry output circuit SCCROC of the first back dummy stage BDSTG1 may charge the scan carry output node SC_CR_NO to the high level when the scan control node SC_NQ is charged and a first carry clock signal CR_CK1 has the high level, and may discharge the scan carry output circuit SCCROC to the first low gate voltage VGL1 when the voltage of the scan inverting node SC_INV has the high level or the (M+3)-th scan carry signal SC_CRM+3 has the high level. Further, the sensing carry output circuit SSCROC of the first back dummy stage BDSTG1 may charge the sensing carry output node SS_CR_NO to the high level when the sensing control node SS_NQ is charged and the first carry clock signal CR_CK1 has the high level, and may discharge the sensing carry output node SS_CR_NO to the first low gate voltage VGL1 when the voltage of the sensing inverting node SS_INV has the high level or the (M+3)-th sensing carry signal SS_CRM+3 has the high level. Thus, the first back dummy stage BDSTG1 may output an (M+1)-th scan carry signal SC_CRM+1 while the scan carry output node SC_CR_NO is charged, and may output an (M+1)-th sensing carry signal SS_CRM+1 while the sensing carry output node SS_CR_NO is charged. For example, the scan carry output circuit SCCROC may include an eleventh scan transistor SCT11 that charges the scan carry output node SC_CR_NO when the scan control node SC_NQ is charged and boosted and the first carry clock signal CR_CK1 has the high level. The scan carry output circuit SCCROC may further include a twelfth scan transistor SCT12 that discharges the scan carry output node SC_CR_NO when the voltage of the scan inverting node SC_INV has the high level, and may further include a thirteenth scan transistor SCT13 that discharges the scan carry output node SC_CR_NO when the (M+3)-th scan carry signal SC_CRM+3 has the high level. Further, the sensing carry output circuit SSCROC may include an eleventh sensing transistor SST11 that charges the sensing carry output node SS_CR_NO when the sensing control node SS_NQ is charged and boosted and the first carry clock signal CR_CK1 has the high level. The sensing carry output circuit SSCROC may further include a twelfth sensing transistor SST12 that discharges the sensing carry output node SS_CR_NO when the voltage of the sensing inverting node SS_INV has the high level, and may further include a thirteenth sensing transistor SST13 that discharges the sensing carry output node SS_CR_NO when the (M+3)-th sensing carry signal SS_CRM+3 has the high level. In some embodiments, the eleventh scan transistor SCT11 may include a gate connected to the scan control node SC_NQ, a first terminal receiving the first carry clock signal CR_CK1, and a second terminal connected to the scan carry output node SC_CR_NO. The twelfth scan transistor SCT12 may include a gate connected to the scan inverting node SC_INV, a first terminal connected to the scan carry output node SC_CR_NO, and a second terminal receiving the first low gate voltage VGL1. the thirteenth scan transistor SCT13 may include a gate receiving the (M+3)-th scan carry signal SC_CRM+3, a first terminal connected to the scan carry output node SC_CR_NO, and a second terminal receiving the first low gate voltage VGL1. Further, the eleventh sensing transistor SST11 may include a gate connected to the sensing control node SS_NQ, a first terminal receiving the first carry clock signal CR_CK1, and a second terminal connected to the sensing carry output node SS_CR_NO. The twelfth sensing transistor SST12 may include a gate connected to the sensing inverting node SS_INV, a first terminal connected to the sensing carry output node SS_CR_NO, and a second terminal receiving the first low gate voltage VGL1. The thirteenth sensing transistor SST13 may include a gate receiving the (M+3)-th sensing carry signal SS_CRM+3, a first terminal connected to the sensing carry output node SS_CR_NO, and a second terminal receiving the first low gate voltage VGL1.

The scan discharging circuit SCDC may discharge the scan control node SC_NQ, and the sensing discharging circuit SSDC may discharge the sensing control node SS_NQ. The scan discharging circuit SCDC of the first back dummy stage BDSTG1 may discharge the scan control node SC_NQ based on a scan start signal STV, an (M+4)-th scan carry signal SC_CRM+4 or the voltage of the scan inverting node SC_INV. The sensing discharging circuit SSDC of the first back dummy stage BDSTG1 may discharge the sensing control node SS_NQ based on the scan start signal STV, an (M+4)-th sensing carry signal SS_CRM+4 or the voltage of the sensing inverting node SS_INV. For example, the scan discharging circuit SCDC may include a fourteenth scan transistor SCT14 that discharges the scan control node SC_NQ when the scan start signal STV has the high level, a fifteenth scan transistor SCT15 that discharges the scan control node SC_NQ when the (M+4)-th scan carry signal SC_CRM+4 has the high level, and a sixteenth scan transistor SCT16 that discharges the scan control node SC_NQ when the voltage of the scan inverting node SC_INV has the high level. Further, the sensing discharging circuit SSDC may include a fourteenth sensing transistor SST14 that discharges the sensing control node SS_NQ when the scan start signal STV has the high level, a fifteenth sensing transistor SST15 that discharges the sensing control node SS_NQ when the (M+4)-th sensing carry signal SS_CRM+4 has the high level, and a sixteenth sensing transistor SST16 that discharges the sensing control node SS_NQ when the voltage of the sensing inverting node SS_INV has the high level. In some embodiments, the fourteenth scan transistor SCT14 may include a gate receiving the scan start signal STV, a first terminal connected to the scan control node SC_NQ, and a second terminal receiving the first low gate voltage VGL1. The fifteenth scan transistor SCT15 may include a gate receiving the (M+4)-th scan carry signal SC_CRM+4, a first terminal connected to the scan control node SC_NQ, and a second terminal receiving the first low gate voltage VGL1, and the sixteenth scan transistor SCT16 may include a gate connected to the scan inverting node SC_INV, a first terminal connected to the scan control node SC_NQ, and a second terminal receiving the first low gate voltage VGL1. Further, the fourteenth sensing transistor SST14 may include a gate receiving the scan start signal STV, a first terminal connected to the sensing control node SS_NQ, and a second terminal receiving the first low gate voltage VGL1. The fifteenth sensing transistor SST15 may include a gate receiving the (M+4)-th sensing carry signal, a first terminal connected to the sensing control node SS_NQ, and a second terminal receiving the first low gate voltage VGL1. The sixteenth sensing transistor SST16 may include a gate connected to the sensing inverting node SS_INV, a first terminal connected to the sensing control node SS_NQ, and a second terminal receiving the first low gate voltage VGL1.

In some embodiments, the first through sixteenth scan transistors SCT1 through SCT16 and the first through sixteenth sensing transistors SST1 through SST16 may be implemented as, but not are limited to, n-type metal oxide semiconductor (NMOS) transistors or oxide transistors. Further, in some embodiments, as illustrated in FIG. 4, the third scan transistor SCT3, the fourth scan transistor SCT4, the fourteenth scan transistor SCT14, the fifteenth scan transistor SCT15, and the sixteenth scan transistor SCT16, the third sensing transistor SST3, the fourth sensing transistor SST4, the fourteenth sensing transistor SST14, the fifteenth sensing transistor SST15 and the sixteenth sensing transistor SST16 may have, but are limited to, a dual transistor structure including two serially connected sub-transistors.

Figure 5:
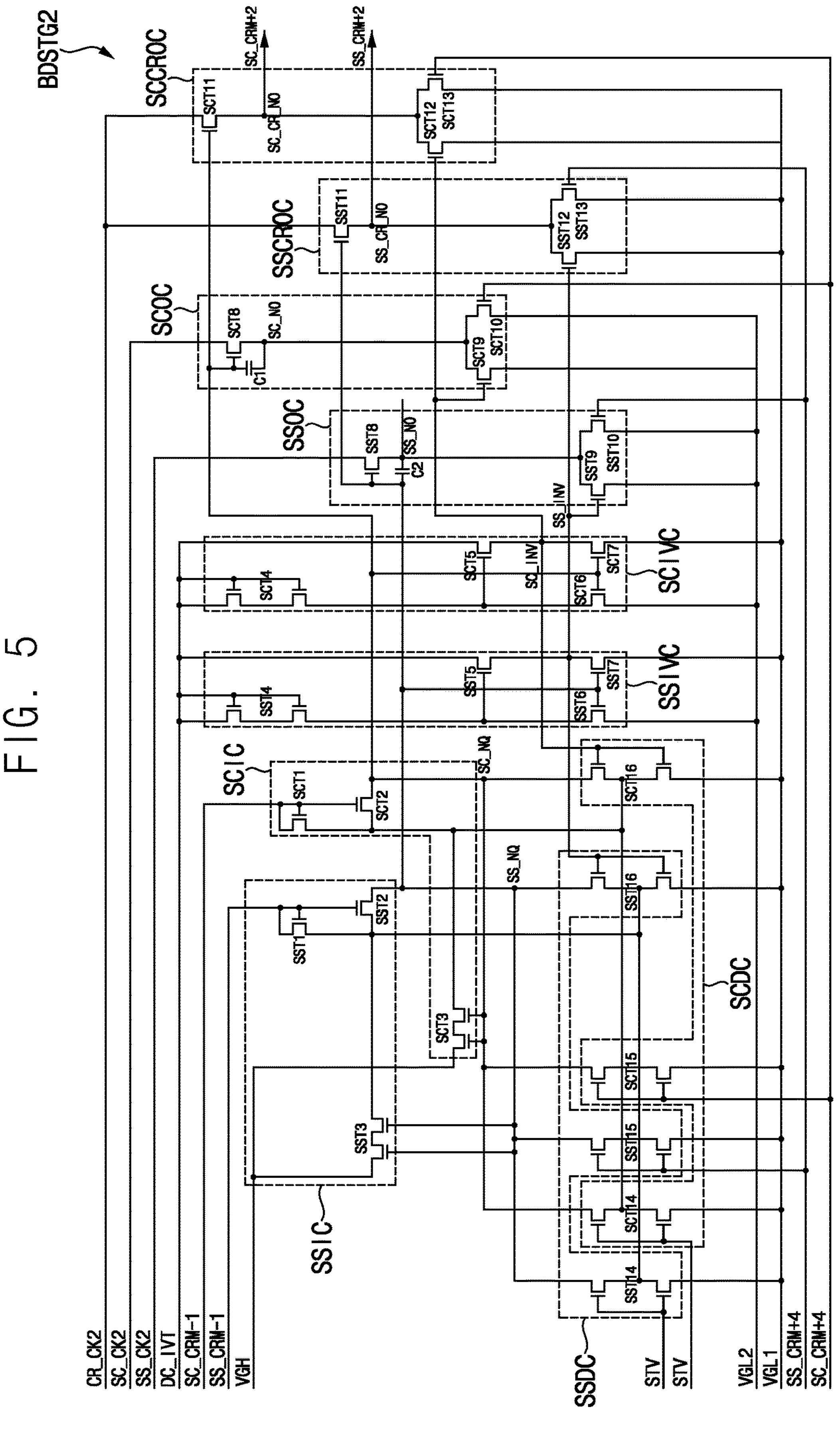
FIG. 5 is a circuit diagram illustrating an example of a second back dummy stage.

FIG. 5 is a circuit diagram illustrating an example of a second back dummy stage (e.g., BDSTG2).

Referring to FIG. 5, a second back dummy stage BDSTG2 includes a scan input circuit SCIC, a sensing input circuit SSIC, a scan inverting circuit SCIVC, a sensing inverting circuit SSIVC, a scan output circuit SCOC, a sensing output circuit SSOC, a scan carry output circuit SCCROC, a sensing carry output circuit SSCROC, a scan discharging circuit SCDC and a sensing discharging circuit SSDC. The second back dummy stage BDSTG2 of FIG. 5 may have a similar configuration and a similar operation to the first back dummy stage BDSTG1 of FIG. 4, except that the scan input circuit SCIC receives an (M−1)-th scan carry signal SC_CRM-1, the sensing input circuit SSIC receives an (M−1)-th sensing carry signal SS_CRM-1, the scan output circuit SCOC receives a second scan clock signal SC_CK2 and an (M+4)-th scan carry signal SC_CRM+4, the sensing output circuit SSOC receives a second sensing clock signal SS_CK2 and an (M+4)-th sensing carry signal SS_CRM+4, the scan carry output circuit SCCROC receives a second carry clock signal CR_CK2 and the (M+4)-th scan carry signal SC_CRM+4 and outputs an (M+2)-th scan carry signal SC_CRM+2, and the sensing carry output circuit SSCROC receives the second carry clock signal CR_CK2 and the (M+4)-th sensing carry signal SS_CRM+4 and outputs an (M+2)-th sensing carry signal SS_CRM+2.

The scan input circuit SCIC of the second back dummy stage BDSTG2 may charge a scan control node SC_NQ in response to the (M−1)-th scan carry signal SC_CRM-1. The sensing input circuit SSIC may charge a sensing control node SS_NQ in response to the (M−1)-th sensing carry signal SS_CRM-1.

The scan output circuit SCOC of the second back dummy stage BDSTG2 may charge a scan output node SC_NO based on the second scan clock signal SC_CK2, and may discharge the scan output node SC_NO based on the (M+4)-th scan carry signal SC_CRM+4. The sensing output circuit SSOC of the second back dummy stage BDSTG2 may charge a sensing output node SS_NO based on the second sensing clock signal SS_CK2, and may discharge the sensing output node SS_NO based on the (M+4)-th sensing carry signal SS_CRM+4.

The scan carry output circuit SCCROC of the second back dummy stage BDSTG2 may charge a scan carry output node SC_CR_NO based on the second carry clock signal CR_CK2, and may discharge the scan carry output node SC_CR_NO based on the (M+4)-th scan carry signal SC_CRM+4. The sensing carry output circuit SSCROC of the second back dummy stage BDSTG2 may charge a sensing carry output node SS_CR_NO based on the second carry clock signal CR_CK2, and may discharge the sensing carry output node SS_CR_NO based on the (M+4)-th sensing carry signal SS_CRM+4.

The scan discharging circuit SCDC of the second back dummy stage BDSTG2 may discharge the scan control node SC_NQ based on the (M+4)-th scan carry signal SC_CRM+4. The sensing discharging circuit SSDC of the second back dummy stage BDSTG2 may discharge the sensing control node SS_NQ based on the (M+4)-th sensing carry signal SS_CRM+4. In a conventional gate driver, a scan control node and a sensing control node of a second back dummy stage are discharged using a separate reset signal. However, in a gate driver according to an embodiment, the scan control node SC_NQ and the sensing control node SS_NQ of the second back dummy stage BDSTG2 may be discharged at an appropriate time or with appropriate timing without the separate reset signal or without an additional line to provide the separate reset signal.

Although FIG. 5 illustrates an example where the scan discharging circuit SCDC and the sensing discharging circuit SSDC of the second back dummy stage BDSTG2 discharge the scan control node SC_NQ and the sensing control node SS_NQ based on the (M+4)-th scan carry signal SC_CRM+4 and the (M+4)-th sensing carry signal SS_CRM+4, embodiments of the disclosure are not limited thereto. For example, in embodiments illustrated in FIGS. 10 and 11, the scan discharging circuit SCDC and the sensing discharging circuit SSDC of the second back dummy stage BDSTG2 may discharge the scan control node SC_NQ and the sensing control node SS_NQ based on a fourth carry clock signal CR_CK4 (or a fourth scan clock signal SC_CK4 and/or a fourth sensing clock signal SS_CK4).

Figure 6:
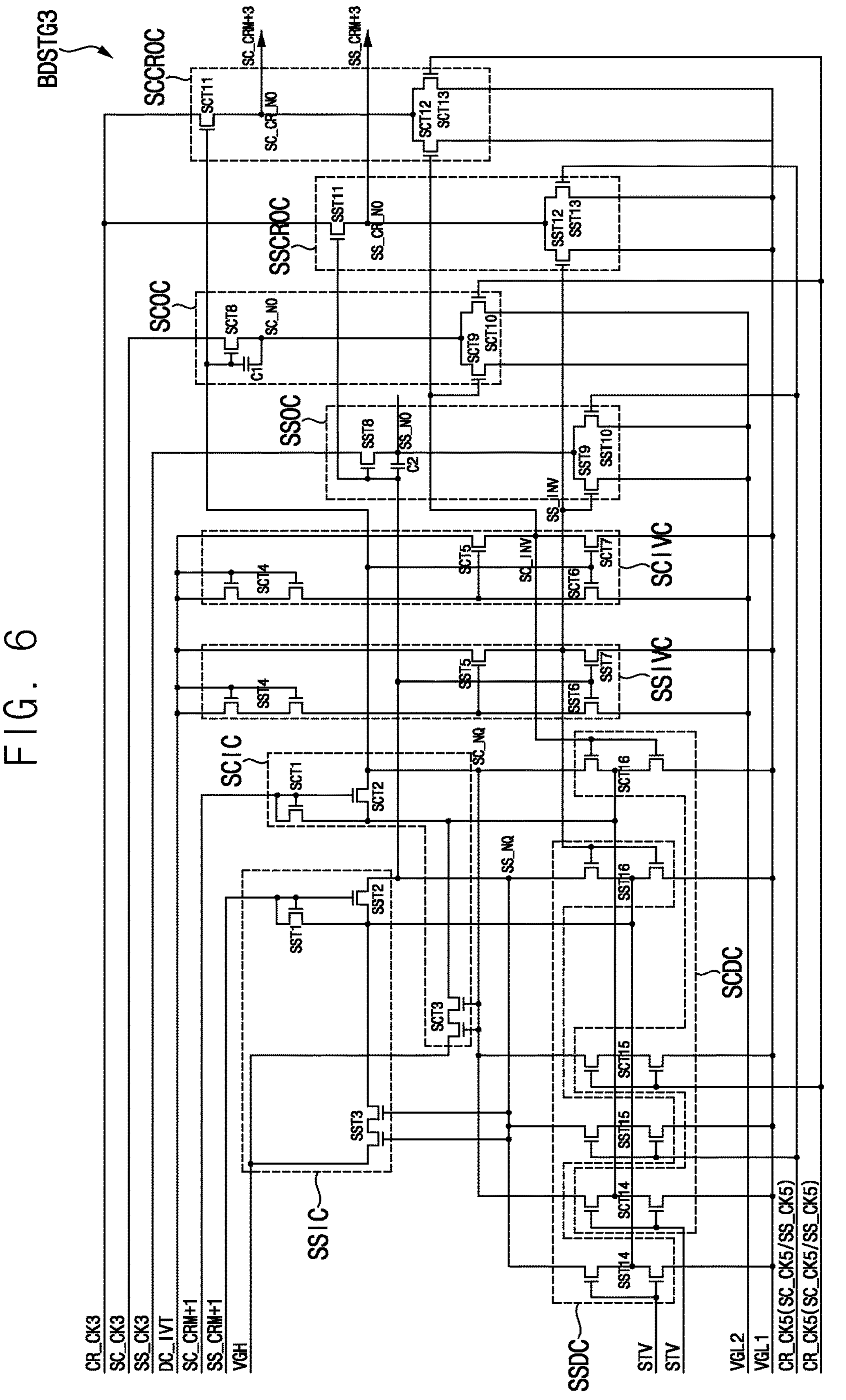
FIG. 6 is a circuit diagram illustrating an example of a third back dummy stage.

FIG. 6 is a circuit diagram illustrating an example of a third back dummy stage (e.g., BDSTG3).

Referring to FIG. 6, a third back dummy stage BDSTG3 includes a scan input circuit SCIC, a sensing input circuit SSIC, a scan inverting circuit SCIVC, a sensing inverting circuit SSIVC, a scan output circuit SCOC, a sensing output circuit SSOC, a scan carry output circuit SCCROC, a sensing carry output circuit SSCROC, a scan discharging circuit SCDC and a sensing discharging circuit SSDC. The third back dummy stage BDSTG3 of FIG. 6 may have a similar configuration and a similar operation to the first back dummy stage BDSTG1 of FIG. 4 or the second back dummy stage BDSTG2 of FIG. 5, except that the scan input circuit SCIC receives an (M+1)-th scan carry signal SC_CRM+1, the sensing input circuit SSIC receives an (M+1)-th sensing carry signal SS_CRM+1, the scan output circuit SCOC receives a third scan clock signal SC_CK3 and a fifth carry clock signal CR_CK5, the sensing output circuit SSOC receives a third sensing clock signal SS_CK3 and the fifth carry clock signal CR_CK5, the scan carry output circuit SCCROC receives a third carry clock signal CR_CK3 and the fifth carry clock signal CR_CK5 and outputs an (M+3)-th scan carry signal SC_CRM+3, and the sensing carry output circuit SSCROC receives the third carry clock signal CR_CK3 and the fifth carry clock signal CR_CK5 and outputs an (M+3)-th sensing carry signal SS_CRM+3.

The scan input circuit SCIC of the third back dummy stage BDSTG3 may charge a scan control node SC_NQ in response to the (M+1)-th scan carry signal SC_CRM+1. The sensing input circuit SSIC of the third back dummy stage BDSTG3 may charge a sensing control node SS_NQ in response to the (M+1)-th sensing carry signal SS_CRM+1. Unlike the active stages and the first and second back dummy stages, the third back dummy stage BDSTG3 charges the scan control node SC_NQ and the sensing control node SS_NQ based on the (M+1)-th scan carry signal SC_CRM+1 and the (M+1)-th sensing carry signal SS_CRM+1 of the first back dummy stage that is its second previous stage.

The scan output circuit SCOC of the third back dummy stage BDSTG3 may charge a scan output node SC_NO based on the third scan clock signal SC_CK3, and may discharge the scan output node SC_NO based on the fifth carry clock signal CR_CK5. The sensing output circuit SSOC of the third back dummy stage BDSTG3 may charge a sensing output node SS_NO based on the third sensing clock signal SS_CK3, and may discharge the sensing output node SS_NO based on the fifth carry clock signal CR_CK5. In a conventional gate driver, a scan output node and a sensing output node of a third back dummy stage is discharged using a separate reset signal. However, in a gate driver according to an embodiment, the scan output node SC_NO and the sensing output node SS_NO of the third back dummy stage BDSTG3 may be discharged based on the fifth carry clock signal CR_CK5 without using the separate reset signal or using an additional line providing the separate reset signal. In other embodiments, a fifth scan clock signal SC_CK5 and/or a fifth sensing clock signal SS_CK5 may be used to discharge the scan output node SC_NO and the sensing output node SS_NO instead of (or along with) the fifth carry clock signal CR_CK5.

The scan carry output circuit SCCROC of the third back dummy stage BDSTG3 may charge a scan carry output node SC_CR_NO based on the third carry clock signal CR_CK3, and may discharge the scan carry output node SC_CR_NO based on the fifth carry clock signal CR_CK5. The sensing carry output circuit SSCROC of the third back dummy stage BDSTG3 may charge a sensing carry output node SS_CR_NO based on the third carry clock signal CR_CK3, and may discharge the sensing carry output node SS_CR_NO based on the fifth carry clock signal CR_CK5. In a conventional gate driver, a scan carry output node and a sensing carry output node of a third back dummy stage is discharged using a separate reset signal. However, in the gate driver according to an embodiment, the scan carry output node SC_CR_NO and the sensing carry output node SS_CR_NO of the third back dummy stage BDSTG3 may be discharged based on the fifth carry clock signal CR_CK5 without using the separate reset signal or using an additional line providing the separate reset signal. In other embodiments, the fifth scan clock signal SC_CK5 and/or the fifth sensing clock signal SS_CK5 may be used to discharge the scan carry output node SC_CR_NO and the sensing carry output node SS_CR_NO instead of (or along with) the fifth carry clock signal CR_CK5.

The scan discharging circuit SCDC of the third back dummy stage BDSTG3 may discharge the scan control node SC_NQ based on the fifth carry clock signal CR_CK5. The sensing discharging circuit SSDC of the third back dummy stage BDSTG3 may discharge the sensing control node SS_NQ based on the fifth carry clock signal CR_CK5. In a conventional gate driver, a scan control node and a sensing control node of a third back dummy stage are discharged using a separate reset signal. However, in the gate driver according to an embodiment, the scan control node SC_NQ and the sensing control node SS_NQ of the third back dummy stage BDSTG3 may be discharged based on the fifth carry clock signal CR_CK5 without using the separate reset signal. In other embodiments, the fifth scan clock signal SC_CK5 and/or the fifth sensing clock signal SS_CK5 may be used to discharge the scan control node SC_NQ and the sensing control node SS_NQ instead of (or along with) the fifth carry clock signal CR_CK5.

Figure 7:
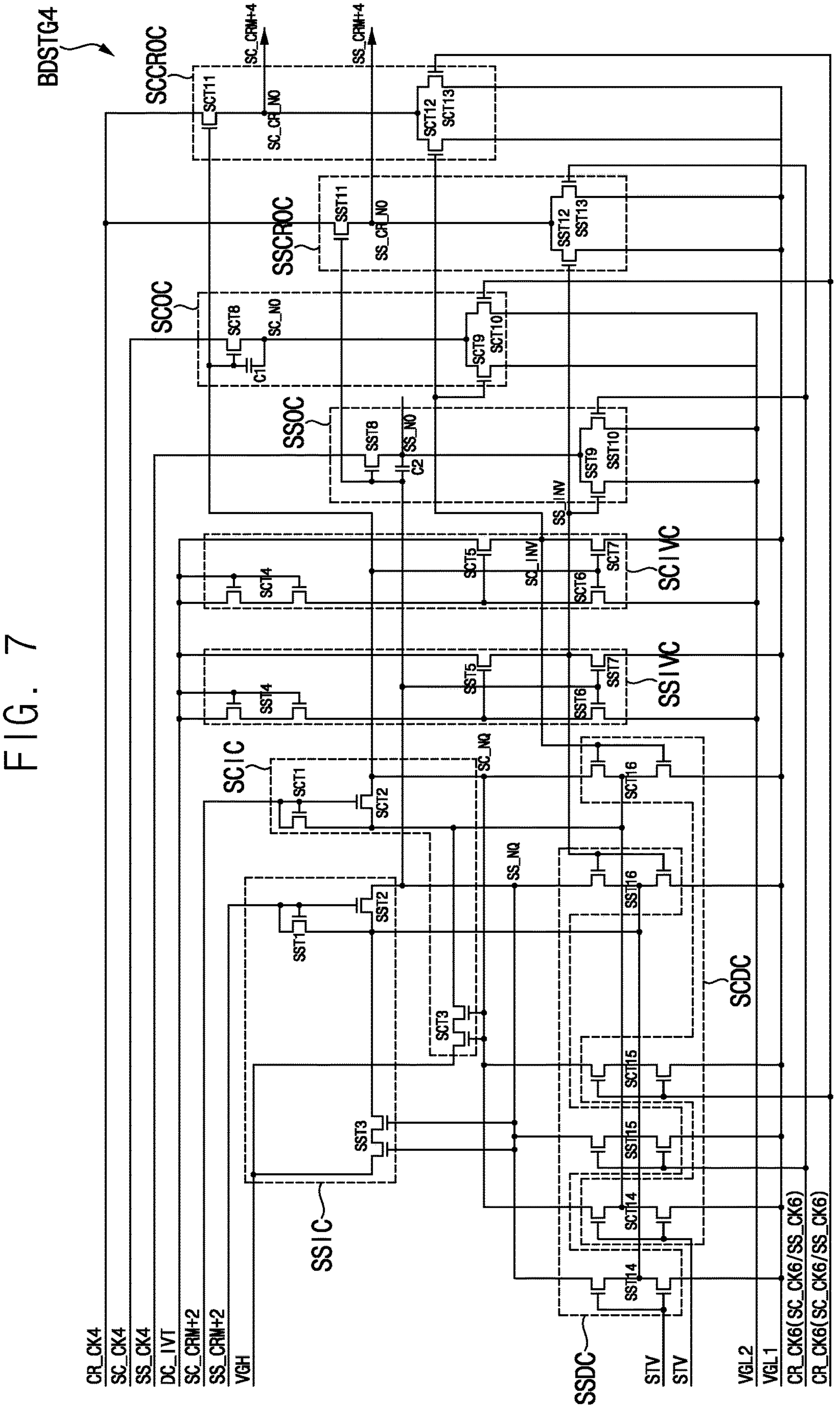
FIG. 7 is a circuit diagram illustrating an example of a fourth back dummy stage.

FIG. 7 is a circuit diagram illustrating an example of a fourth back dummy stage (e.g., BDSTG4).

Referring to FIG. 7, a fourth back dummy stage BDSTG4 includes a scan input circuit SCIC, a sensing input circuit SSIC, a scan inverting circuit SCIVC, a sensing inverting circuit SSIVC, a scan output circuit SCOC, a sensing output circuit SSOC, a scan carry output circuit SCCROC, a sensing carry output circuit SSCROC, a scan discharging circuit SCDC and a sensing discharging circuit SSDC. The fourth back dummy stage BDSTG4 of FIG. 7 may have a similar configuration and a similar operation to the first back dummy stage BDSTG1 of FIG. 4, the second back dummy stage BDSTG2 of FIG. 5 or the third back dummy stage BDSTG3 of FIG. 6, except that the scan input circuit SCIC receives an (M+2)-th scan carry signal SC_CRM+2, the sensing input circuit SSIC receives an (M+2)-th sensing carry signal SS_CRM+2, the scan output circuit SCOC receives a fourth scan clock signal SC_CK4 and a sixth carry clock signal CR_CK6, the sensing output circuit SSOC receives a fourth sensing clock signal SS_CK4 and the sixth carry clock signal CR_CK6, the scan carry output circuit SCCROC receives a fourth carry clock signal CR_CK4 and the sixth carry clock signal CR_CK6 and outputs an (M+4)-th scan carry signal SC_CRM+4, and the sensing carry output circuit SSCROC receives the fourth carry clock signal CR_CK4 and the sixth carry clock signal CR_CK6 and outputs an (M+4)-th sensing carry signal SS_CRM+4.

The scan input circuit SCIC of the fourth back dummy stage BDSTG4 may charge a scan control node SC_NQ in response to the (M+2)-th scan carry signal SC_CRM+2, and the sensing input circuit SSIC of the fourth back dummy stage BDSTG4 may charge a sensing control node SS_NQ in response to the (M+2)-th sensing carry signal SS_CRM+2. Unlike the active stages and the first and second back dummy stages, the fourth back dummy stage BDSTG4 may charge the scan control node SC_NQ and the sensing control node SS_NQ based on the (M+2)-th scan carry signal SC_CRM+2 and the (M+2)-th sensing carry signal SS_CRM+2 of the second back dummy stage that is its second previous stage.

The scan output circuit SCOC of the fourth back dummy stage BDSTG4 may charge a scan output node SC_NO based on the fourth scan clock signal SC_CK4, and may discharge the scan output node SC_NO based on the sixth carry clock signal CR_CK6. The sensing output circuit SSOC of the fourth back dummy stage BDSTG4 may charge a sensing output node SS_NO based on the fourth sensing clock signal SS_CK4, and may discharge the sensing output node SS_NO based on the sixth carry clock signal CR_CK6. In a conventional gate driver, a scan output node and a sensing output node of a third back dummy stage are discharged using a separate reset signal. However, in a gate driver according to an embodiment, the scan output node SC_NO and the sensing output node SS_NO of the fourth back dummy stage BDSTG4 may be discharged based on the sixth carry clock signal CR_CK6 without using the separate reset signal or without an additional line providing the separate reset signal. In other embodiments, a sixth scan clock signal SC_CK6 and/or a sixth sensing clock signal SS_CK6 may be used to discharge the scan output node SC_NO and the sensing output node SS_NO instead of (or along with) the sixth carry clock signal CR_CK6.

The scan carry output circuit SCCROC of the fourth back dummy stage BDSTG4 may charge a scan carry output node SC_CR_NO based on the fourth carry clock signal CR_CK4, and may discharge the scan carry output node SC_CR_NO based on the sixth carry clock signal CR_CK6. The sensing carry output circuit SSCROC of the fourth back dummy stage BDSTG4 may charge a sensing carry output node SS_CR_NO based on the fourth carry clock signal CR_CK4, and may discharge the sensing carry output node SS_CR_NO based on the sixth carry clock signal CR_CK6. In a conventional gate driver, a scan carry output node and a sensing carry output node of a fourth back dummy stage are discharged using a separate reset signal. However, in the gate driver according to an embodiment, the scan carry output node SC_CR_NO and the sensing carry output node SS_CR_NO of the fourth back dummy stage BDSTG4 may be discharged based on the sixth carry clock signal CR_CK6 without using the separate reset signal or without an additional line to provide the separate reset signal. In other embodiments, the sixth scan clock signal SC_CK6 and/or the sixth sensing clock signal SS_CK6 may be used to discharge the scan carry output node SC_CR_NO and the sensing carry output node SS_CR_NO instead of (or along with) the sixth carry clock signal CR_CK6.

The scan discharging circuit SCDC of the fourth back dummy stage BDSTG4 may discharge the scan control node SC_NQ based on the sixth carry clock signal CR_CK6. The sensing discharging circuit SSDC of the fourth back dummy stage BDSTG4 may discharge the sensing control node SS_NQ based on the sixth carry clock signal CR_CK6. In a conventional gate driver, a scan control node and a sensing control node of a fourth back dummy stage are discharged using a separate reset signal. However, in the gate driver according to an embodiment, the scan control node SC_NQ and the sensing control node SS_NQ of the fourth back dummy stage BDSTG4 may be discharged based on the sixth carry clock signal CR_CK6 without using the separate reset signal or without an additional line providing the separate reset signal. In other embodiments, the sixth scan clock signal SC_CK6 and/or the sixth sensing clock signal SS_CK6 may be used to discharge the scan control node SC_NQ and the sensing control node SS_NQ instead of (or along with) the sixth carry clock signal CR_CK6.

Figure 8:
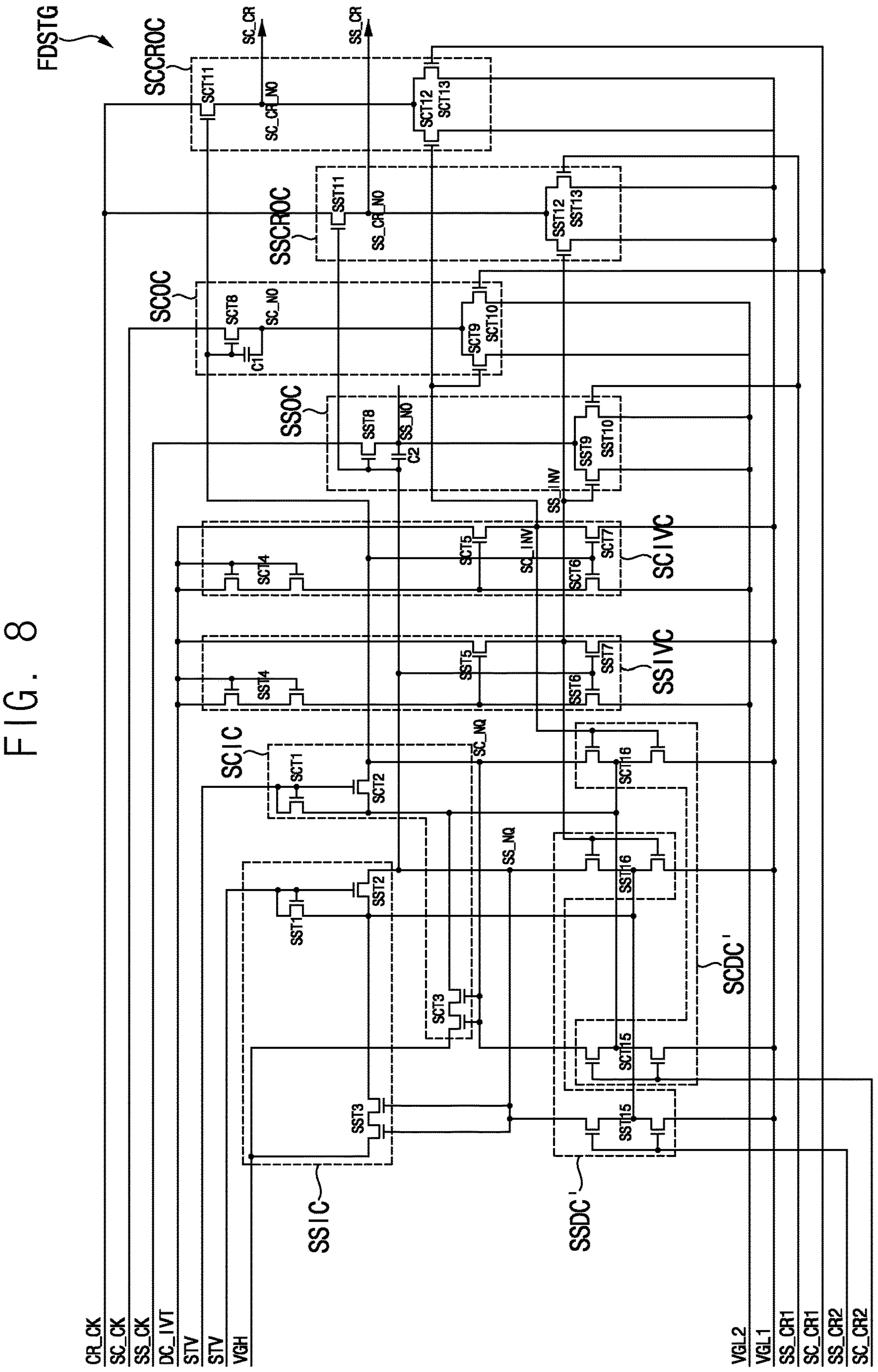
FIG. 8 is a circuit diagram illustrating an example of a front dummy stage.

FIG. 8 is a circuit diagram illustrating an example of a front dummy stage.

Referring to FIG. 8, a front dummy stage FDSTG includes a scan input circuit SCIC that receives a scan start signal STV, a sensing input circuit SSIC that receives the scan start signal STV, a scan inverting circuit SCIVC, a sensing inverting circuit SSIVC, a scan output circuit SCOC that receives a scan clock signal SC_CK and a first next scan carry signal SC_CR1, a sensing output circuit SSOC that receives a sensing clock signal SS_CK and a first next sensing carry signal SS_CR1, a scan carry output circuit SCCROC that receives a carry clock signal CR_CK and the first next scan carry signal SC_CR1 and outputs a scan carry signal SC_CR, a sensing carry output circuit SSCROC that receives the carry clock signal CR_CK and the first next sensing carry signal SS_CR1 and outputs a sensing carry signal SS_CR, a scan discharging circuit SSDC' that receives a second next scan carry signal SC_CR2, and a sensing discharging circuit SCDC' that receives a second next sensing carry signal SS_CR2. The front dummy stage FDSTG of FIG. 8 may have a similar configuration and a similar operation to first through fourth back dummy stages BDSTG1 through BDSTG4 illustrated in FIGS. 5 through 8, except that the scan discharging circuit SSDC' and the sensing discharging circuit SCDC' do not receive the scan start signal STV. The scan discharging circuit SCDC' of the front dummy stage FDSTG does not include a fourteenth scan transistor, and the sensing discharging circuit SSDC' of the front dummy stage FDSTG does not include a fourteenth sensing transistor. For example, the scan discharging circuit SCDC' does not include the SCT14 and the sensing discharging circuit SSDC' does not include the SST14. The front dummy stage FDSTG may be used to implement front dummy stages FDSTG1, FDSTG2, FDSTG3, or FDSTG4.

Figure 9:
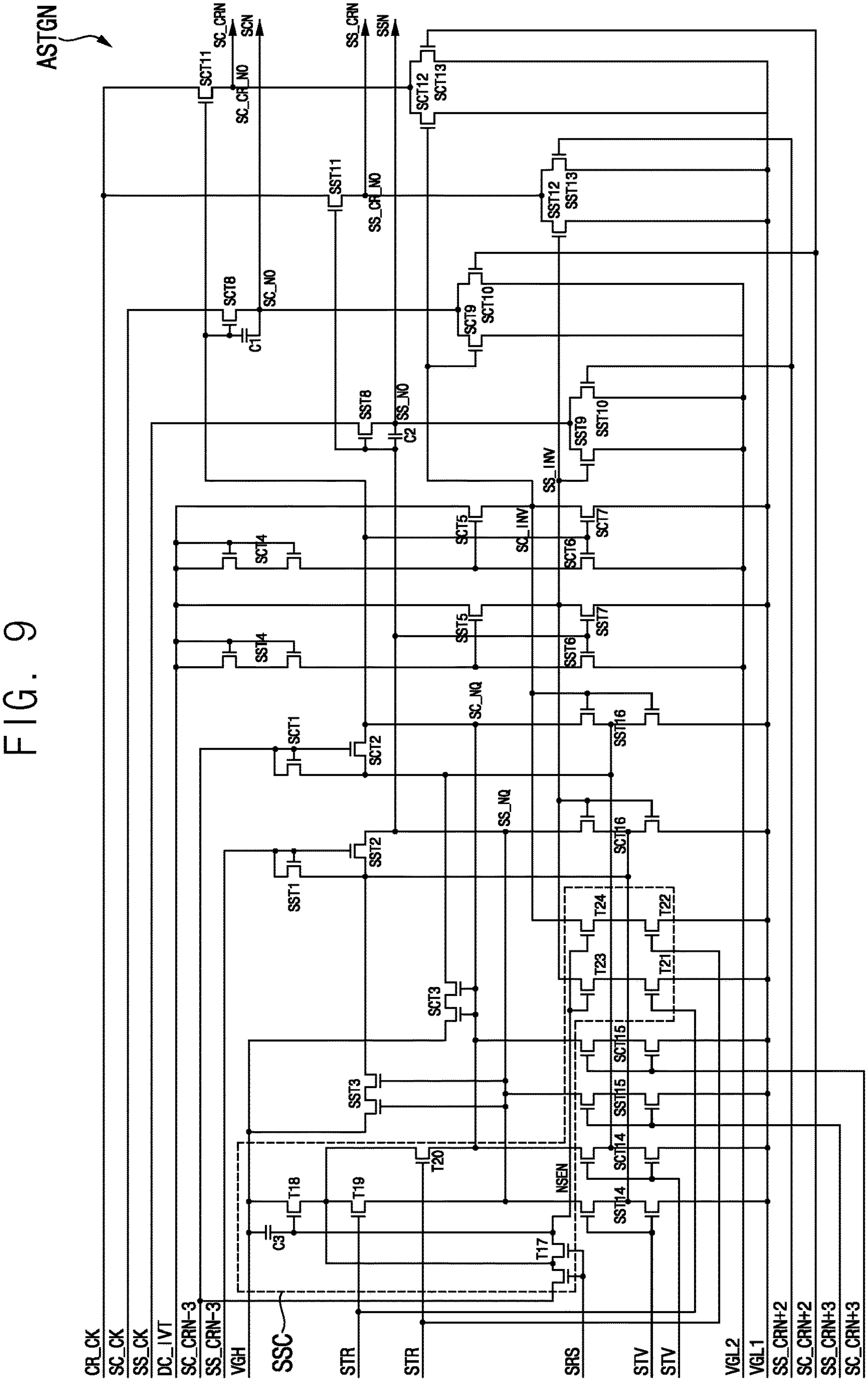
FIG. 9 is a circuit diagram illustrating an example of an active dummy stage.

FIG. 9 is a circuit diagram illustrating an example of an active dummy stage.

Referring to FIG. 9, an N-th active stage ASTGN includes a scan input circuit that receives an (N−3)-th scan carry signal SC_CRN-3, a sensing input circuit that receives an (N−3)-th sensing carry signal SS_CRN-3, a scan inverting circuit, a sensing inverting circuit, a scan output circuit that receives a scan clock signal SC_CK and an (N+2)-th scan carry signal SC_CRN+2 and outputs an N-th scan signal SCN, a sensing output circuit that receives a sensing clock signal SS_CK and an (N+2)-th sensing carry signal SS_CRN+2 and outputs an N-th sensing signal SSN, a scan carry output circuit that receives a carry clock signal CR_CK and the (N+2)-th scan carry signal SC_CRN+2 and outputs an N-th scan carry signal SC_CRN, a sensing carry output circuit that receives the carry clock signal CR_CK and the (N+2)-th sensing carry signal SS_CRN+2 and outputs an N-th sensing carry signal SS_CRN, a scan discharging circuit that receives an (N+3)-th scan carry signal SC_CRN+3, a sensing discharging circuit that receives an (N+3)-th sensing carry signal SS_CRN+3, and a sensing selection circuit SSC. The N-th active stage ASTGN of FIG. 9 may have a similar configuration and a similar operation to first through fourth back dummy stages BDSTG1 through BDSTG4 illustrated in FIGS. 5 through 8, except that the N-th active stage ASTGN further includes the sensing selection circuit SSC. The N-th active stage ASTGN may be used to implement active stages ASTG1, ASTG2, ASTG3, ASTG4, . . . , ASTGM-3, ASTGM-2, ASTGM-1, and ASTGM.

The sensing selection circuit SSC may change a voltage of a sensing node NSEN to a high level in a case where an input signal, or the (N−3)-th scan carry signal SC_CRN-3 has the high level when a random sensing signal SRS is applied, and may transfer the voltage of the sensing node NSEN to a scan control node SC_NQ and a sensing control node SS_NQ in response to a transfer signal STR. Thus, among a plurality of active stages, the voltage of the sensing node NSEN of a selected active stage of which the input signal has the high level when the random sensing signal SRS is applied may have the high level, and the voltages of the sensing nodes NSEN of the remaining active stages may have a low level. Further, the transfer signal STR may be applied to the plurality of active stages when a blank period starts. Thus, in the blank period, the scan control node SC_NQ and the sensing control node SS_NQ of only the selected active stage may be charged, and the scan control nodes SC_NQ and the sensing control node SS_NQ of the remaining active stages may have a discharged stage. Accordingly, in the blank period, the selected active stage may provide a scan signal and a sensing signal to a selected pixel row, and a real-time sensing operation may be performed on the selected pixel row. The blank period may be a period during which data voltages based on image data are not output to a display period.

In some embodiments, the sensing selection circuit SSC includes a seventeenth transistor T17, an eighteenth transistor T18, a nineteenth transistor T19, a twentieth transistor T20, a twenty-first transistor T21, a twenty-second transistor T22, a twenty-third transistor T23, a twenty-fourth transistor T24, and a third capacitor C3. The seventeenth transistor T17 includes a gate receiving the random sensing signal SRS, a first terminal receiving the (N−3)-th scan carry signal SC_CRN-3, and a second terminal connected to the sensing node NSEN. The third capacitor C3 includes a first electrode receiving a high gate voltage VGH and a second electrode connected to the sensing node NSEN. The eighteenth transistor T18 includes a gate connected to the sensing node NSEN, a first terminal receiving the high gate voltage VGH, and a second terminal. The nineteenth transistor T19 includes a gate receiving the transfer signal STR, a first terminal connected to the second terminal of the eighteenth transistor T18, and a second terminal connected to the sensing control node SS_NQ. The twentieth transistor T20 includes a gate receiving the transfer signal STR, a first terminal connected to the second terminal of the eighteenth transistor T18, and a second terminal connected to the scan control node SC_NQ. The twenty-first transistor T21 includes a gate receiving the transfer signal STR, a first terminal, and a second terminal receiving a first low gate voltage VGL1. The twenty-second transistor T22 includes a gate receiving the transfer signal STR, a first terminal, and a second terminal receiving the first low gate voltage VGL1. The twenty-third transistor T23 includes a gate connected to the sensing node NSEN, a first terminal connected to a sensing inverting node SS_INV, and a second terminal connected to the first terminal of the twenty-first transistor T21. The twenty-fourth transistor T24 includes a gate connected to the sensing node NSEN, a first terminal connected to a scan inverting node SC_INV, and a second terminal connected to the first terminal of the twenty-second transistor T22.

Figure 10:
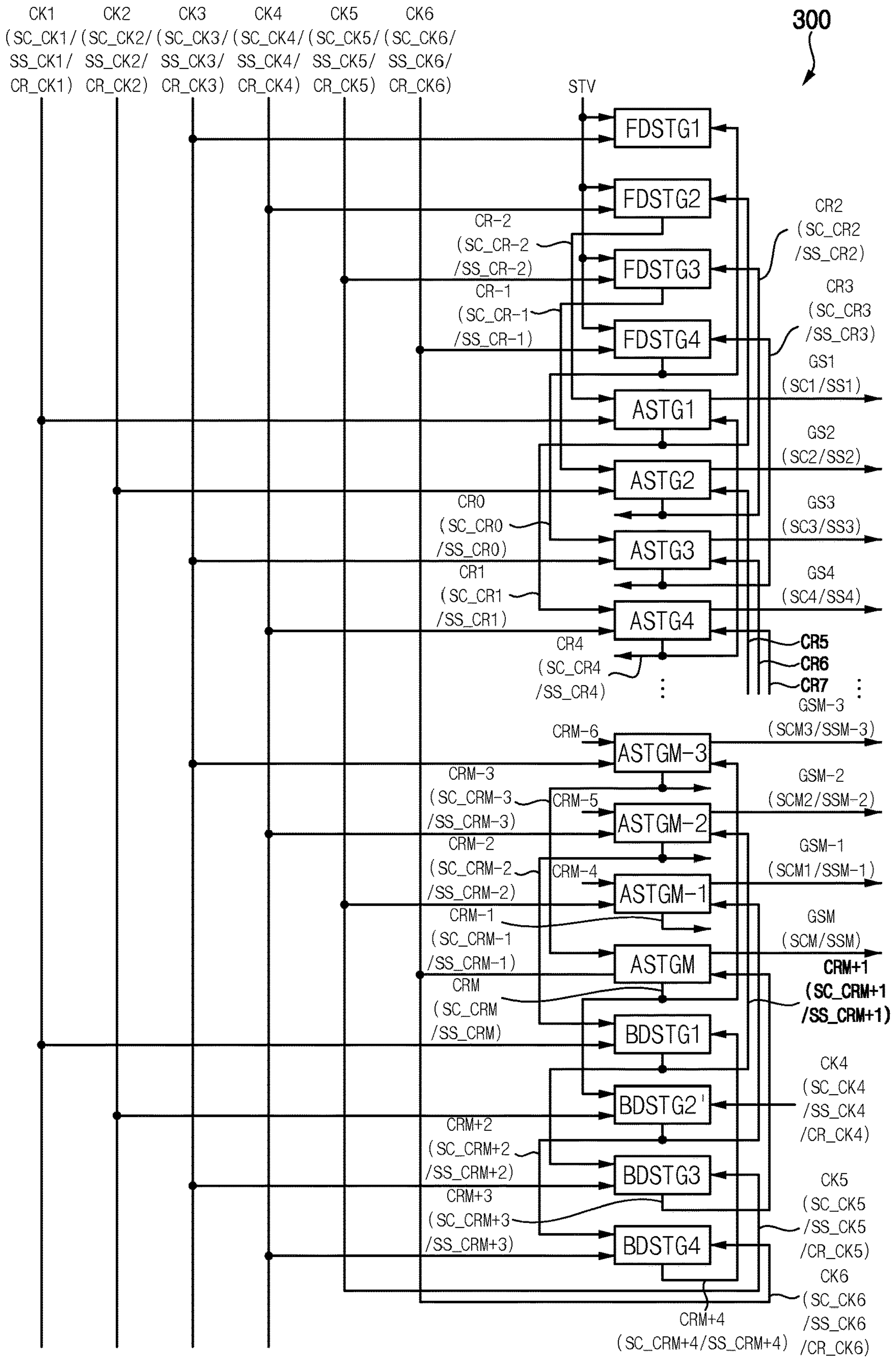
FIG. 10 is a block diagram illustrating a gate driver according to an embodiment.
Figure 11:
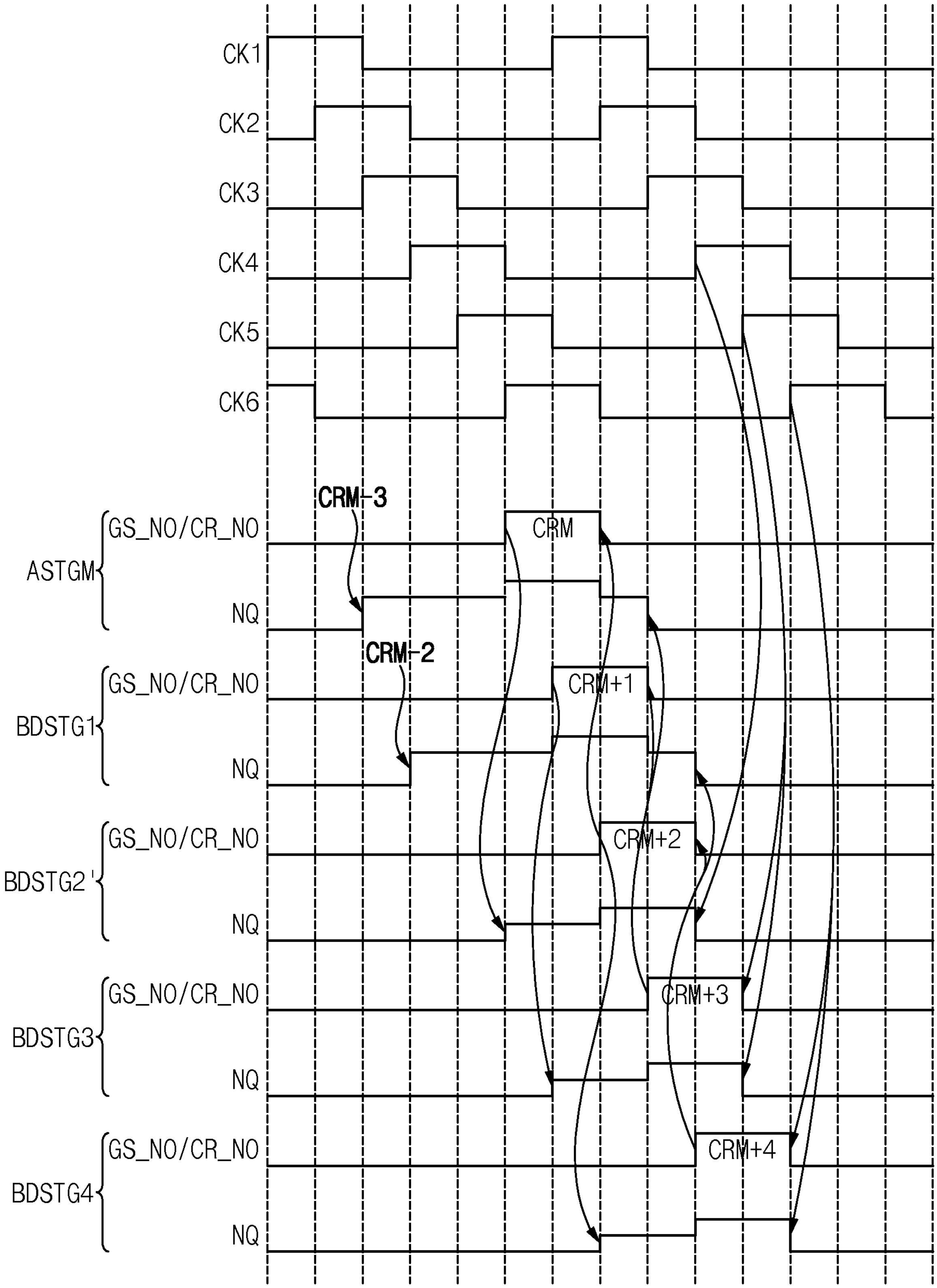
FIG. 11 is a timing diagram for describing an operation of a portion of stages of a gate driver of FIG. 10.

FIG. 10 is a block diagram illustrating a gate driver according to an embodiment, and FIG. 11 is a timing diagram for describing an operation of a portion of stages of a gate driver of FIG. 10.

Referring to FIG. 10, a gate driver 300 according to an embodiment includes first through fourth front dummy stages FDSTG1 through FDSTG4, first through M-th active stages ASTG1 through ASTGM, and first, second, third and fourth back dummy stages BDSTG1, BDSTG2', BDSTG3 and BDSTG4. The gate driver 300 of FIG. 10 may have a similar configuration and a similar operation to a gate driver 100 of FIG. 1, except that the second back dummy stage BDSTG2' receives an M-th carry signal CRM and a fourth clock signal CK4. For example, the second back dummy stage BDSTG2' may receive the M-th carry signal CRM from active stage ASTGM.

As illustrated in FIGS. 10 and 11, the second back dummy stage BDSTG2' may charge a control node NQ based on the M-th carry signal CRM of the M-th active stage ASTGM. In an embodiment, the second back dummy stage BDSTG2' charges a scan control node based on an M-th scan carry signal SC_CRM of the M-th active stage ASTGM, and may charge a sensing control node based on an M—the sensing carry signal SS_CRM of the M-th active stage ASTGM.

Further, as illustrated in FIGS. 10 and 11, the second back dummy stage BDSTG2' may discharge the control node NQ based on the fourth clock signal CK4. In an embodiment, the second back dummy stage BDSTG2' discharges the scan control node based on a fourth scan clock signal SC_CK4, and discharges the sensing control node based on a fourth sensing clock signal SS_CK4.

Figure 12:
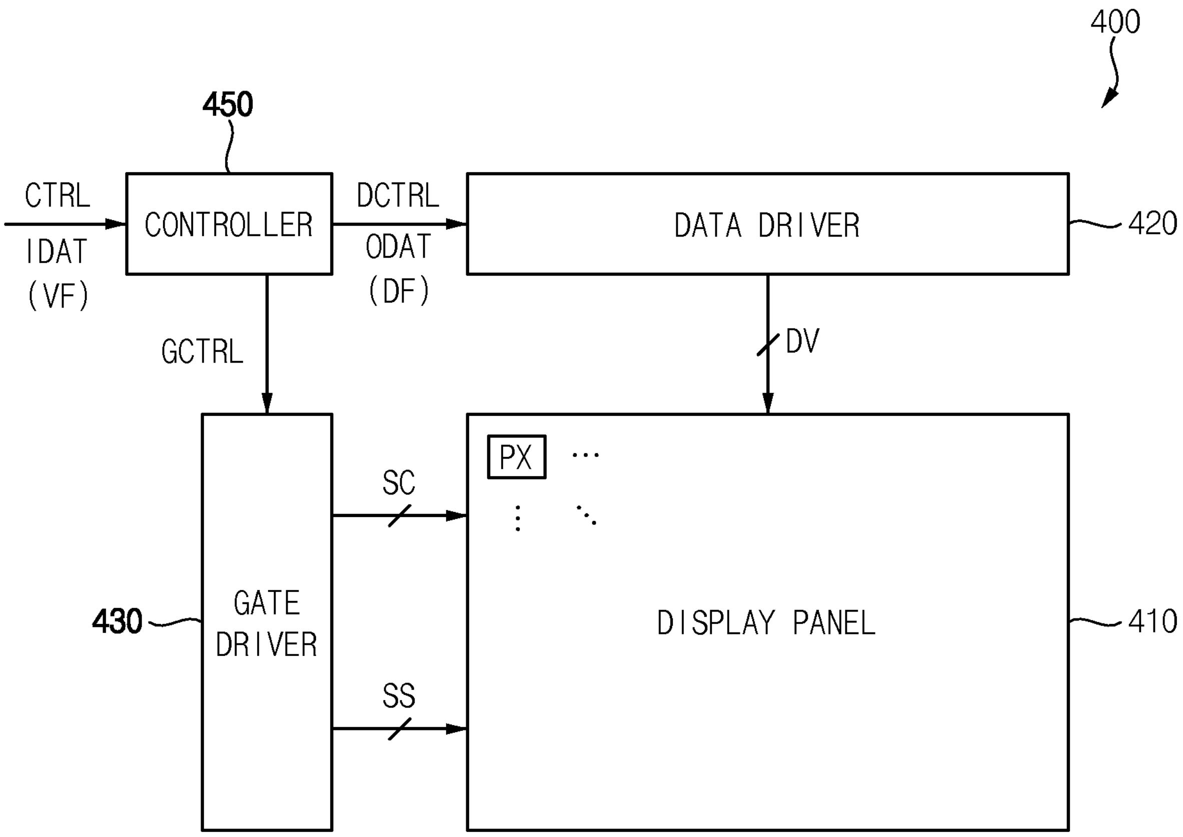
FIG. 12 is a block diagram illustrating a display device according to an embodiment.
Figure 13:
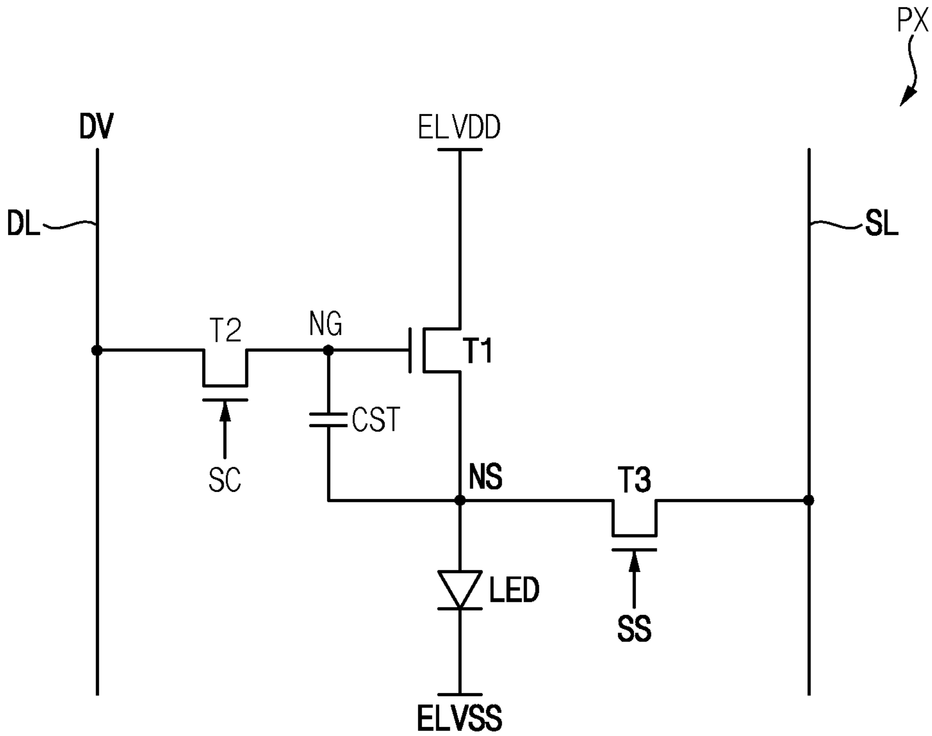
FIG. 13 is a circuit diagram illustrating an example of a pixel included in a display device according to an embodiment.
Figure 14:
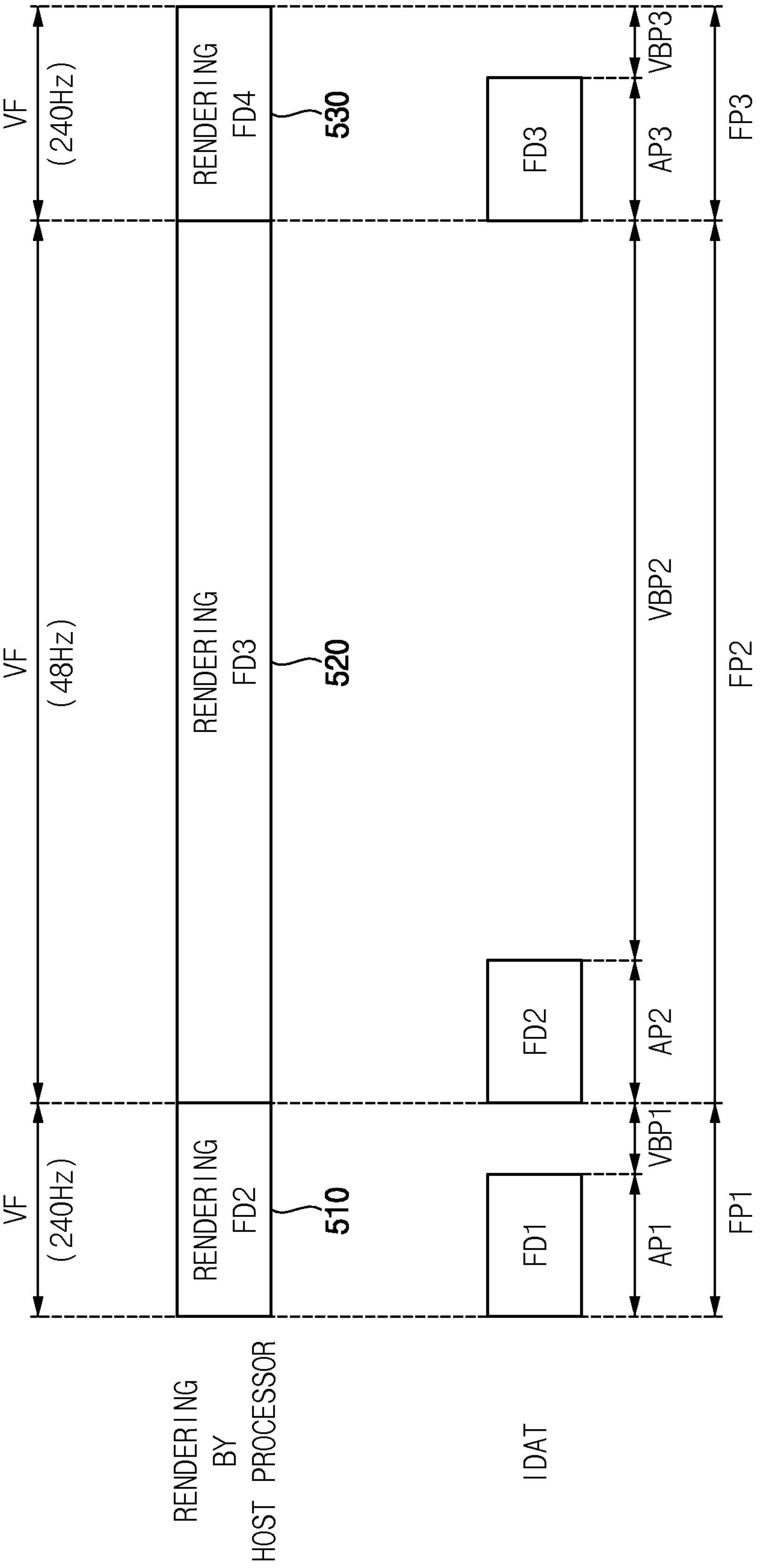
FIG. 14 is a timing diagram illustrating an example of input image data that is input to a display device in a variable frame mode.
Figure 15:
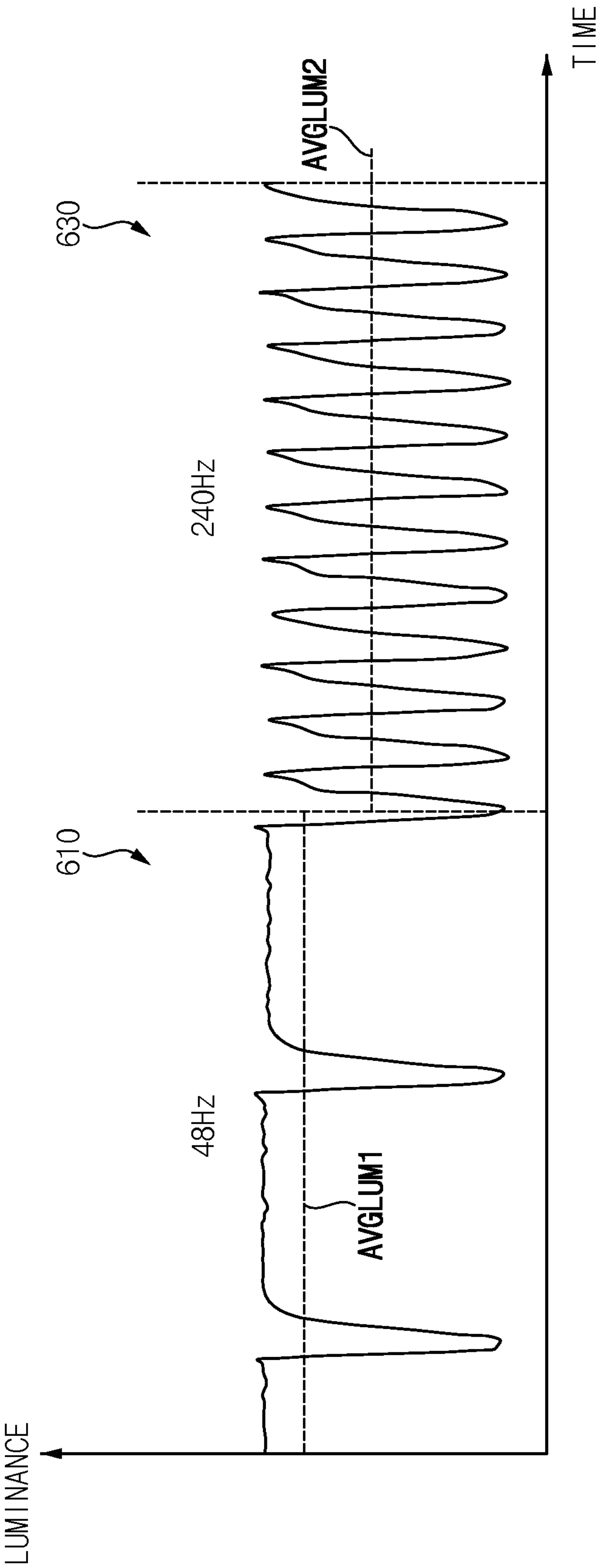
FIG. 15 is a diagram illustrating an example of luminances of a display panel driven at different driving frequencies in a conventional display device.
Figure 16:
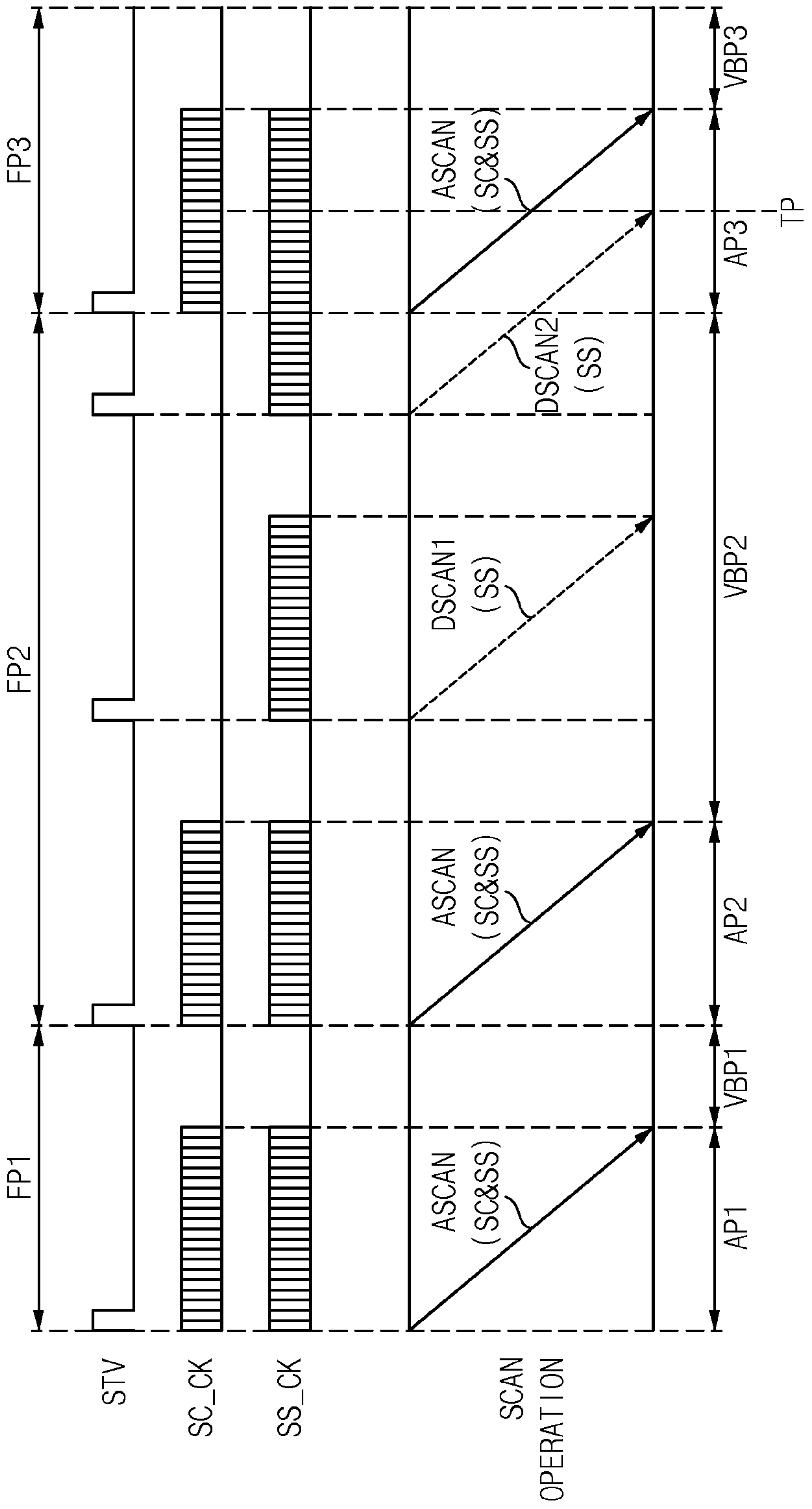
FIG. 16 is a timing diagram for describing an example of an active scan operation and a dummy scan operation in a display device according to an embodiment.
Figure 17:
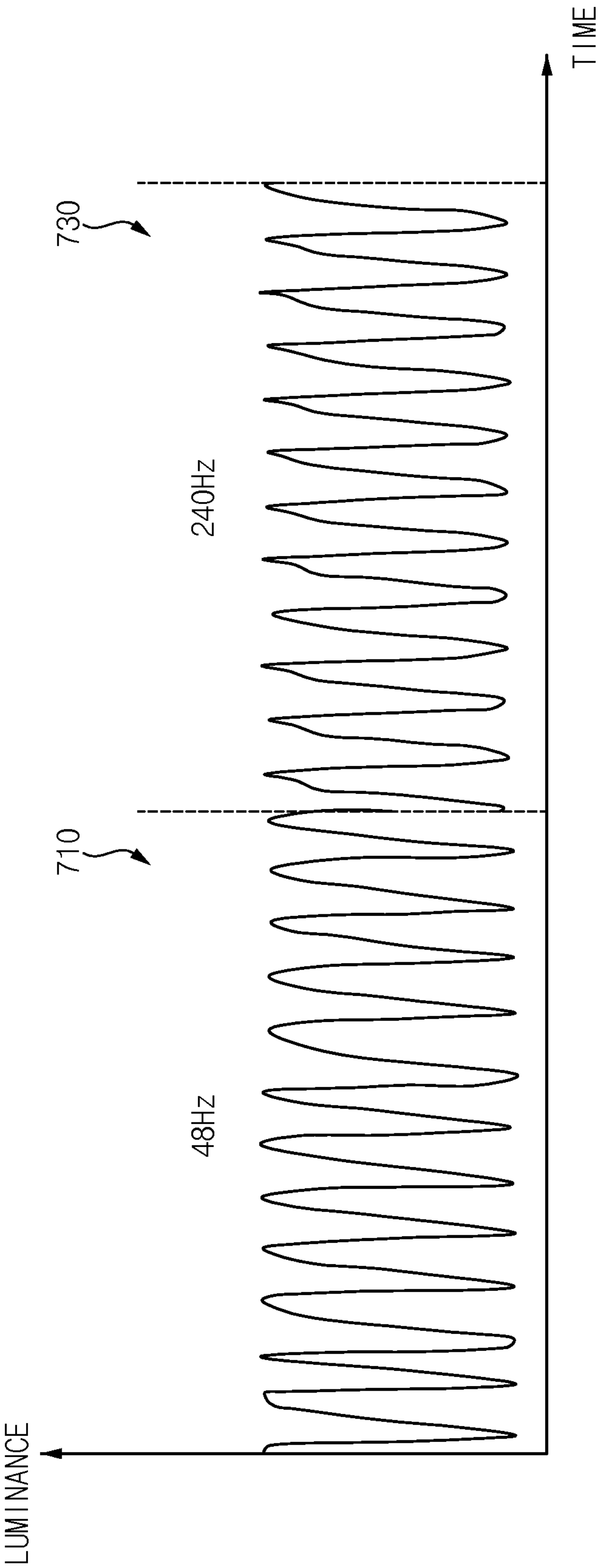
FIG. 17 is a diagram illustrating an example of luminances of a display panel driven at different driving frequencies in a display device according to an embodiment.

FIG. 12 is a block diagram illustrating a display device according to an embodiment. FIG. 13 is a circuit diagram illustrating an example of a pixel included in the display device according to an embodiment. FIG. 14 is a timing diagram illustrating an example of input image data input to the display device in a variable frame mode. FIG. 15 is a diagram illustrating an example of luminances of a display panel driven at different driving frequencies in a conventional display device. FIG. 16 is a timing diagram for describing an example of an active scan operation and a dummy scan operation in a display device according to an embodiment. FIG. 17 is a diagram illustrating an example of luminances of a display panel driven at different driving frequencies in a display device according to an embodiment.

Referring to FIG. 12, a display device 400 according to an embodiment includes a display panel 410 that includes a plurality of pixels PX, a data driver 420 (e.g., a driver circuit) that provides data voltages DV to the plurality of pixels PX, a gate driver 430 (e.g., a driver circuit) that provides first through M-th gate signals (e.g., first through M-th scan signals SC and first through M-th sensing signals SS) to the plurality of pixels PX, and a controller 450 (e.g., a control circuit) that controls the data driver 420 and the gate driver 430.

The display panel 410 may include data lines, gate lines (e.g., scan signal lines and sensing signal lines), sensing lines, and the plurality of pixels PX connected thereto. In some embodiments, each pixel PX may include a light emitting element, and the display panel 410 may be a light emitting display panel.

For example, as illustrated in FIG. 13, each pixel PX may have a 3T1C structure including a first transistor T1, a second transistor T2, a third transistor T3, a capacitor CST and a light emitting element LED.

The capacitor CST may store the data voltage DV transferred by the second transistor T2 from the data line DL. The capacitor CST may be referred to as, but is not limited to, a storage capacitor for storing the data voltage DV. In an embodiment, the capacitor CST includes a first electrode connected to a first node NG (e.g., a gate node), and a second electrode connected to a second node NS (e.g., a source node).

The first transistor T1 may generate a driving current based on the data voltage DV stored in the capacitor CST. The first transistor T1 may be referred to as, but is not limited to, a driving transistor for generating the driving current. In some embodiments, the first transistor T1 may include a gate connected to the first node NG, a first terminal (e.g., a drain) receiving a first power supply voltage ELVDD, and a second terminal (e.g., a source) connected to the second node NS.

The second transistor T2 may transfer the data voltage DV to the first node NG in response to the scan signal SC. The second transistor T2 may be referred to as, but is not limited to, a scan transistor. In some embodiments, the second transistor T2 may include a gate receiving the scan signal SC, a first terminal connected to the data line DL, and a second terminal connected to the first node NG.

The third transistor T3 may connect the second node NS to the sensing line SL in response to the sensing signal SS. The third transistor T3 may be referred to as, but is not limited to, a sensing transistor. In some embodiments, the third transistor T3 may include a gate receiving the sensing signal SS, a first terminal connected to the second node NS, and a second terminal connected to the sensing line SL.

The light emitting element LED may emit light based on the driving current flowing from a line transferring the first power supply voltage ELVDD to a line transferring a second power supply voltage ELVSS. A level of the first power supply voltage ELVDD may be higher than a level of the second power supply voltage ELVSS. In some embodiments, the light emitting element LED may include an anode connected to the second node NS, and a cathode connected to the line transferring the second power supply voltage ELVSS. In some embodiments, the light emitting element LED may be an organic light emitting diode (OLED). In other embodiments, the light emitting element LED may be a nano light emitting diode (NED), a quantum dot (QD) light emitting diode, a micro light emitting diode, an inorganic light emitting diode, or any other suitable light emitting element.

In some embodiments, as illustrated in FIG. 13, the first through third transistors T1 through T3 may be implemented with, but is not limited to, NMOS transistors. Further, although FIG. 13 illustrates an example of the pixel PX having the 3T1C structure, the pixel PX according to embodiments is not limited to the example of FIG. 13. In other embodiments, the display panel 410 may be a liquid crystal display (LCD) panel, or any other suitable display panel.

The data driver 420 may generate the data voltages DV based on output image data ODAT and a data control signal DCTRL received from the controller 450, and may provide the data voltages DV to the plurality of pixels PX through the data lines. In some embodiments, the data control signal DCTRL may include, but is not limited to, an output data enable signal, a horizontal start signal and a load signal. Further, in some embodiments, the data driver 420 may receive the output image data ODAT at a driving frequency DF that is varied or changed within a variable frequency range (e.g., from about 48 Hz to about 240 Hz) from the controller 450. In some embodiments, the data driver 420 and the controller 450 may be implemented with a single integrated circuit, and the single integrated circuit may be referred to as a timing controller embedded data driver (TED) integrated circuit. In other embodiments, the data driver 420 and the controller 450 may be implemented with separate integrated circuits.

The gate driver 430 may generate the first through M-th gate signals based on a gate control signal GCTRL received from the controller 450, and may sequentially provide the first through M-th gate signals to the plurality of pixels PX on a pixel row basis through the gate lines. In some embodiments, the gate driver 430 may generate, as the first through M-th gate signals, the first through M-th scan signals SC and the first through M-th sensing signals SS, may sequentially provide the first through M-th scan signals SC to the plurality of pixels PX on a pixel row basis through the scan signal lines, and may sequentially provide the first through M-th sensing signals SS to the plurality of pixels PX on a pixel row basis through the sensing signal lines. In some embodiments, the gate control signal GCTRL may include, but is not limited to, a scan start signal, a scan clock signal, a sending clock signal, a carry clock signal, etc. In some embodiments, the gate driver 430 may be integrated or formed in the display panel 410. In other embodiments, the gate driver 430 may be implemented with one or more integrated circuits.

The controller 450 (e.g., a timing controller) may receive input image data IDAT and a control signal CTRL from an external host processor (e.g., a graphics processing unit (GPU), an application processor (AP) or a graphics card). In some embodiments, the input image data IDAT may be red-green-blue (RGB) image data including red image data, green image data and blue image data. In some embodiments, the control signal CTRL may include, but is not limited to, a vertical synchronization signal, a horizontal synchronization signal, an input data enable signal, a master clock signal, etc. The controller 450 may generate the output image data ODAT, the data control signal DCTRL and the gate control signal GCTRL based on the input image data IDAT and the control signal CTRL. The controller 450 may control an operation of the data driver 420 by providing the output image data ODAT and the data control signal DCTRL to the data driver 420, and may control an operation of the gate driver 430 by providing the gate control signal GCTRL to the gate driver 430.

The host processor may provide the input image data IDAT to the display device 400 at a variable frequency VF (or a variable frame rate) by changing a time length of a blank period in each frame period. The controller 450 may receive the input image data IDAT from the host processor at the variable frequency VF that is varied or changed within the variable frequency range. For example, the variable frequency range may range from about 48 Hz to about 240 Hz, but is not limited thereto. Further, in the display device 400 according to embodiments, a driving frequency DF of the display panel 410 may be determined as the variable frequency VF that is varied or changed within the variable frequency range. Thus, the controller 450 may control the data driver 420 and the gate driver 430 to drive the display panel 10 at the driving frequency DF the same as or substantially the same as the variable frequency VF. In some embodiments, a mode of the display device 400 in which the display panel 410 is driven at the variable frequency VF may be referred to as a variable frame mode. For example, the variable frame mode may be, but is not limited to, a Free-Sync mode, a G-Sync mode, etc.

For example, as illustrated in FIG. 14, a period of each of renderings 510, 520 and 530 by the host processor (e.g., the GPU, the AP or the graphics card) need not be constant (in particular, in a case where game image data is rendered), and the host processor may provide the input image data IDAT, or frame data FD1, FD2 and FD3 to the display device 400 in synchronization with, respectively, these irregular periods of renderings 510, 520 and 530 in the variable frame mode. Thus, in the variable frame mode, each frame period FP1, FP2 and FP3 may include an active period AP1, AP2 and AP3 having a constant time length, and the host processor may provide the frame data FD1, FD2 and FD3 to the display device 400 at the variable frequency VF by changing a time length of a blank period VBP1, VBP2 and VBP3 of each frame period FP1, FP2 and FP3. For example, a blank period in a given frame period may be increased or decreased relative to a prior frame period to change the driving frequency.

In an example of FIG. 14, if a rendering 510 for second frame data FD2 is performed at a frequency of about 240 Hz in a first frame period FP1, the host processor may provide first frame data FD1 to the display device 400 at the variable frequency VF of about 240 Hz in the first frame period FP1. Further, the host processor may output the second frame data FD2 during an active period AP2 of a second frame period FP2, and may continue or maintain a blank period VBP2 of the second frame period FP2 until a rendering 520 for third frame data FD3 has completed. Thus, in the second frame period FP2, if the rendering 520 for the third frame data FD3 is performed at a frequency of about 48 Hz, the host processor may provide the second frame data FD2 to the display device 400 at the variable frequency VF of about 48 Hz by increasing a time length of the blank period VBP2 of the second frame period FP2. In a third frame period FP3, if a rendering 530 for fourth frame data FD4 is performed at a frequency of about 240 Hz, the host processor may provide the third frame data FD3 to the display device 400 at the variable frequency VF of about 240 Hz.

A conventional display device that operates in the variable frame mode may have different luminances at different driving frequencies DF. That is, in the conventional display device, each pixel PX may receive the sensing signal SS only once in each of the frame periods FP1, FP2, and FP3, the second node NS of each pixel PX may be initialized only once based on an initialization voltage VINT in each of the frame periods FP1, FP2, and FP3, and the light emitting element LED of each pixel PX may be turned off only once in each of the frame periods FP1, FP2 and FP3. Further, in a case where the driving frequency DF is varied or changed, or in a case where a time length of the frame periods FP1, FP2 and FP3 is varied or changed, the number of times the sensing signal SS is applied to each pixel PX for a certain period of time, or the number of times the light emitting element LED of each pixel PX is turned off may be varied or changed. Accordingly, even if the conventional display device displays an image at the same gray level, if the driving frequency DF of the display panel 410 is changed, the luminance of the display panel 410 may be changed. For example, as illustrated in FIG. 15, in the conventional display device, during the same time, each light emitting element LED of the display panel 410 driven at the driving frequency DF of about 48 Hz may be turned off about 2 times, but each light emitting element LED of the display panel 410 driven at the driving frequency DF of about 240 Hz may be turned off about 12 times. Accordingly, an average AVGLUM2 of the luminance 630 of the display panel 410 driven at the driving frequency DF of about 240 Hz may be lower than an average AVGLUM1 of the luminance 610 of the display panel 410 driven at the driving frequency DF of about 48 Hz.

However, to reduce this luminance difference of the display panel 410 driven at different driving frequencies DF, in the display device 400 according to an embodiment, the gate driver 430 performs not only an active scan operation that sequentially provides the scan signals SC and the sensing signals SS to the plurality of pixels PX on a row-by-row basis in an active period of each frame period, but also a dummy scan operation that sequentially provides the sensing signals SS to the plurality of pixels PX on a row-by-row basis in a blank period of each frame period. In an embodiment, the gate driver 430 repeatedly performs the dummy scan operation at a regular interval until the blank period ends.

For example, as illustrated in FIG. 16, in an active period AP1 of a first frame period FP1, the gate driver 430 may perform the active scan operation ASCAN that sequentially provides the scan signals SC and the sensing signals SS to the plurality of pixels PX of the display panel 410. Further, in an active period AP2 of a second frame period FP2, the gate driver 430 may perform the active scan operation ASCAN. If a blank period VBP2 of the second frame period FP2 lasts for a predetermined time, the controller 450 may provide a scan start signal STV and a sensing clock signal SS_CK to the gate driver 430, and need not provide a scan clock signal SC_CK to the gate driver 430. The gate driver 430 may perform a first dummy scan operation DSCAN1 by sequentially providing the sensing signals SS to the plurality of pixels PX of the display panel 410 based on the start signal STV and the sensing clock signal SS_CK and by not providing the scan signals SC. Further, after the predetermined time from when the first dummy scan operation DSCAN1 has completed, the gate driver 430 may perform a second dummy scan operation DSCAN2 by sequentially providing the sensing signals SS to the plurality of pixels PX of the display panel 410 and by not providing the scan signals SC. Even if a third frame period FP3 has started before the second dummy scan operation DSCAN2 has completed, the gate driver 430 may perform the active scan operation ASCAN that sequentially provides the scan signals SC and the sensing signals SS to the plurality of pixels PX of the display panel 410 in an active period AP3 of the third frame period FP3. Thus, the second dummy scan operation DSCAN2 and the active scan operation ASCAN may be simultaneously performed in at least a portion of the active period AP3 of the third frame period FP3.

As described above, in the display device 400 according to an embodiment, since the dummy scan operations DSCAN1 and DSCAN2 are performed during the blank period VBP2, the display device 400 may have substantially the same luminance at different driving frequencies DF. For example, as illustrated in FIG. 17, in the display device 400 according to an embodiment, during a same time, each light emitting element LED of the display panel 410 driven at the driving frequency DF of about 48 Hz and each light emitting diode LED of the display panel 410 driven at the driving frequency DF of about 240 Hz are turned off at the same times or at substantially the same times, or may be turned off about 12 times. Accordingly, in the display device 400 according to embodiments, the luminance 710 of the display panel 410 driven at the driving frequency DF of about 48 Hz and the luminance 730 of the display panel 410 driven at the driving frequency DF of about 240 Hz may be the same or substantially the same as each other.

In the example illustrated in FIG. 16, in a case where back dummy stages of the gate driver 430 are not discharged at a time point TP at which the second dummy scan operation DSCAN2 has completed, the active scan operation ASCAN may not be normally performed in the active period AP3 of the third frame period FP3. In the conventional gate driver, back dummy stages are discharged using a separate reset signal. However, in the variable frame mode, a completion time TP of the dummy scan operation may be an arbitrary time within an active period, and thus the reset signal may not be generated at an appropriate time or with appropriate timing, that is, at the completion time TP of the dummy scan operation. However, in the gate driver 430 according to an embodiment, at least one back dummy stage may discharge a control node and/or an output node of the back dummy stage based on a clock signal (e.g., a carry clock signal, a scan clock signal and/or a sensing clock signal) without using the separate reset signal. Accordingly, the gate driver 430 according to an embodiment may be implemented without a line transferring the separate reset signal for discharging the nodes of the back dummy stage. Further, in the variable frame mode, even if the active scan operation and the dummy scan operation are simultaneously or substantially simultaneously performed, the nodes of the back dummy stage of the gate driver 430 according to embodiments may be normally discharged.

Figure 18:
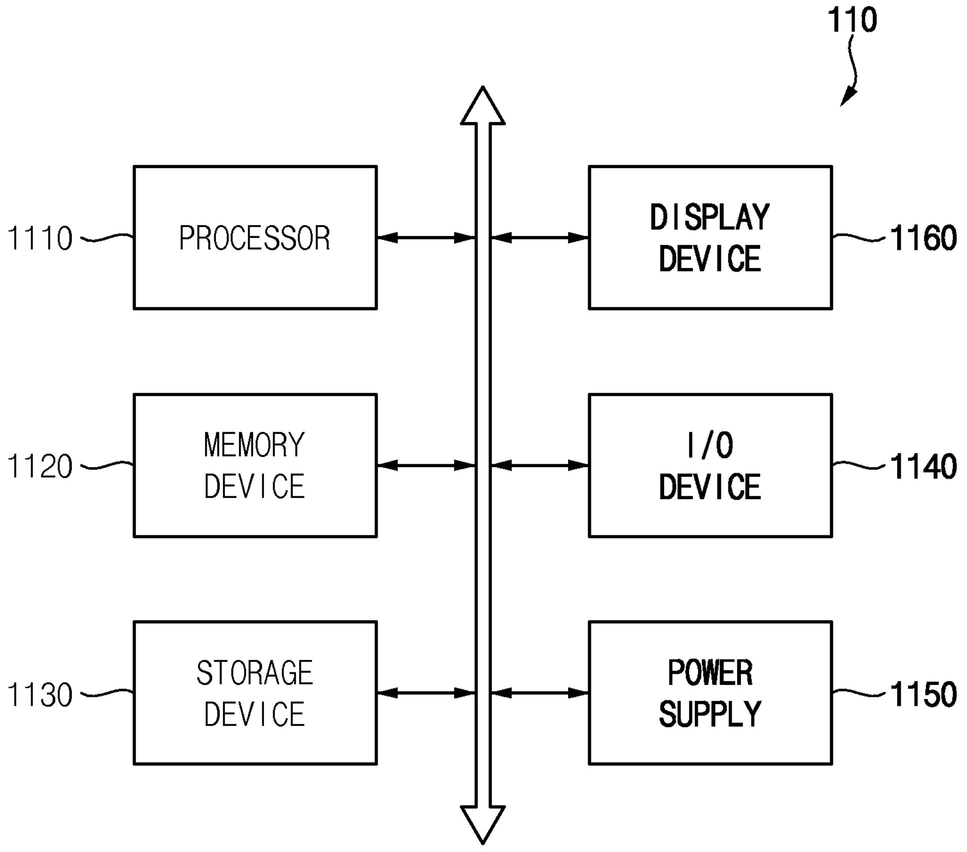
FIG. 18 is a block diagram illustrating an electronic device including a display device according to an embodiment.

FIG. 18 is a block diagram illustrating an electronic device including a display device according to an embodiment.

Referring to FIG. 18, an electronic device 1100 includes a processor 1110, a memory device 1120, a storage device 1130, an input/output (I/O) device 1140, a power supply 1150, and a display device 1160. The electronic device 1100 may further include a plurality of ports for communicating a video card, a sound card, a memory card, a universal serial bus (USB) device, other electric devices, etc.

The processor 1110 may perform various computing functions or tasks. The processor 1110 may be an application processor (AP), a micro processor, a central processing unit (CPU), etc. The processor 1110 may be connected to other components via an address bus, a control bus, a data bus, etc. Further, in some embodiments, the processor 1110 may be further connected to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc, and/or at least one volatile memory device such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may be an input device such as a keyboard, a keypad, a mouse, a touch screen, etc, and an output device such as a printer, a speaker, etc. The power supply 1150 may supply power for operations of the electronic device 1100. The display device 1160 may be connected to other components through the buses or other communication links.

In the display device 1160, at least one back dummy stage of a gate driver may discharge a control node and/or an output node of the back dummy stage based on a clock signal. Accordingly, the gate driver may be implemented without a line transferring a separate reset signal for discharging a node of the back dummy stage. Further, in a variable frame mode in which a frame frequency is changed, even if an active scan operation and a dummy scan operation are simultaneously or substantially simultaneously performed, the node of the back dummy stage of the gate driver according to embodiments may be normally discharged.

The inventive concepts may be applied to any display device 1160 supporting a variable frame mode, and any electronic device 1100 including the display device 1160. For example, the inventive concepts may be applied to a smart phone, a wearable electronic device, a tablet computer, a mobile phone, a television (TV), a digital TV, a 3D TV, a personal computer (PC), a home appliance, a laptop computer, a personal digital assistant (PDA), a portable multimedia player (PMP), a digital camera, a music player, a portable game console, a navigation device, etc.

The foregoing is illustrative of embodiments and is not to be construed as limiting thereof. Although a few embodiments have been described, those skilled in the art will readily appreciate that many modifications are possible in the embodiments without departing from the present inventive concept. Accordingly, all such modifications are intended to be included within the scope of the present inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A gate driver comprising:

M active stages configured to generate first through M-th carry signals and first through M-th gate signals based on clock signals, where M is an integer greater than or equal to 4; and K back dummy stages configured to generate (M+1)-th through (M+K)-th carry signals based on the clock signals, where K is an integer greater than or equal to 3, wherein an N-th active stage of the M active stages discharges a control node of the N-th active stage based on an (N+3)-th carry signal, where N is an integer greater than or equal to 1, and is less than or equal to M, wherein at least one back dummy stage of the K back dummy stages discharges a control node of the at least one back dummy stage based on a corresponding clock signal of the clock signals, and wherein at least one other back dummy stage of the K back dummy stages discharges a control node of the at least one other back dummy stage based on a carry signal generated by a subsequent stage.

2. The gate driver of claim 1, wherein the N-th active stage discharges a gate output node and a carry output node of the N-th active stage based on an (N+2)-th carry signal, and wherein the at least one back dummy stage discharges a gate output node and a carry output node of the at least one back dummy stage based on the corresponding clock signal.

3. The gate driver of claim 1, wherein the N-th active stage charges the control node of the N-th active stage based on an (N−3)-th carry signal, and wherein an L-th back dummy stage of the K back dummy stages charges a control node of the L-th back dummy stage based on a (L−2)-th carry signal, where L is an integer greater than or equal to 3, and is less than or equal to K.

4. The gate driver of claim 1, wherein the clock signals include first, second, third, fourth, fifth and sixth clock signals, and the K back dummy stages include first, second, third and fourth back dummy stages, wherein the first back dummy stage discharges a control node of the first back dummy stage based on an (M+4)-th carry signal generated by the fourth back dummy stage, wherein the second back dummy stage discharges a control node of the second back dummy stage based on the (M+4)-th carry signal generated by the fourth back dummy stage, wherein the third back dummy stage discharges a control node of the third back dummy stage based on the fifth clock signal, and wherein the fourth back dummy stage discharges a control node of the fourth back dummy stage based on the sixth clock signal.

5. The gate driver of claim 4, wherein the first back dummy stage discharges a gate output node and a carry output node of the first back dummy stage based on an (M+3)-th carry signal generated by the third back dummy stage, wherein the second back dummy stage discharges a gate output node and a carry output node of the second back dummy stage based on the (M+4)-th carry signal generated by the fourth back dummy stage, wherein the third back dummy stage discharges a gate output node and a carry output node of the third back dummy stage based on the fifth clock signal, and wherein the fourth back dummy stage discharges a gate output node and a carry output node of the fourth back dummy stage based on the sixth clock signal.

6. The gate driver of claim 4, wherein the first back dummy stage charges the control node of the first back dummy stage based on an (M−2)-th carry signal generated by an (M−2)-th active stage, wherein the second back dummy stage charges the control node of the second back dummy stage based on an (M−1)-th carry signal generated by an (M−1)-th active stage, wherein the third back dummy stage charges the control node of the third back dummy stage based on the (M+1)-th carry signal generated by the first back dummy stage, and wherein the fourth back dummy stage charges the control node of the fourth back dummy stage based on an (M+2)-th carry signal generated by the second back dummy stage.

7. The gate driver of claim 1, wherein the clock signals include first, second, third, fourth, fifth and sixth clock signals, and the K back dummy stages include first, second, third and fourth back dummy stages, wherein the first back dummy stage discharges a control node of the first back dummy stage based on an (M+4)-th carry signal generated by the fourth back dummy stage, wherein the second back dummy stage discharges a control node of the second back dummy stage based on the fourth clock signal, wherein the third back dummy stage discharges a control node of the third back dummy stage based on the fifth clock signal, and wherein the fourth back dummy stage discharges a control node of the fourth back dummy stage based on the sixth clock signal.

8. The gate driver of claim 1, wherein the control node of each of the K back dummy stages includes a scan control node and a sensing control node, and wherein each of the K back dummy stages includes:

a scan input circuit configured to charge the scan control node based on a previous scan carry signal; a sensing input circuit configured to charge the sensing control node based on a previous sensing carry signal;

a scan inverting circuit configured to control a voltage of a scan inverting node based on a voltage of the scan control node; a sensing inverting circuit configured to control a voltage of a sensing inverting node based on a voltage of the sensing control node;

a scan output circuit configured to control a scan output node based on the voltage of the scan control node and the voltage of the scan inverting node; a sensing output circuit configured to control a sensing output node based on the voltage of the sensing control node and the voltage of the sensing inverting node;

a scan carry output circuit configured to control a scan carry output node based on the voltage of the scan control node and the voltage of the scan inverting node;

a sensing carry output circuit configured to control a sensing carry output node based on the voltage of the sensing control node and the voltage of the sensing inverting node;

a scan discharging circuit configured to discharge the scan control node; and a sensing discharging circuit configured to discharge the sensing control node.

9. The gate driver of claim 8, wherein the clock signals include first, second, third, fourth, fifth and sixth scan clock signals, wherein the clock signals include first, second, third, fourth, fifth and sixth sensing clock signals, wherein the clock signals include first, second, third, fourth, fifth and sixth carry clock signals, wherein the K back dummy stages include first, second, third and fourth back dummy stages, wherein the first through (M+K)-th carry signals include first through (M+4)-th scan carry signals and first through (M+4)-th sensing carry signals, wherein the scan discharging circuit of the first back dummy stage discharges the scan control node of the first back dummy stage in response to the (M+4)-th scan carry signal output by the scan carry output circuit of the fourth back dummy stage, wherein the sensing discharging circuit of the first back dummy stage discharges the sensing control node of the first back dummy stage in response to the (M+4)-th sensing carry signal output by the sensing carry output circuit of the fourth back dummy stage, wherein the scan discharging circuit of the second back dummy stage discharges the scan control node of the second back dummy stage in response to the (M+4)-th scan carry signal or the fourth carry clock signal, wherein the sensing discharging circuit of the second back dummy stage discharges the sensing control node of the second back dummy stage in response to the (M+4)-th sensing carry signal or the fourth carry clock signal, wherein the scan discharging circuit of the third back dummy stage discharges the scan control node of the third back dummy stage in response to the fifth carry clock signal, wherein the sensing discharging circuit of the third back dummy stage discharges the sensing control node of the third back dummy stage in response to the fifth carry clock signal, wherein the scan discharging circuit of the fourth back dummy stage discharges the scan control node of the fourth back dummy stage in response to the sixth carry clock signal, and wherein the sensing discharging circuit of the fourth back dummy stage discharges the sensing control node of the fourth back dummy stage in response to the sixth carry clock signal.

10. The gate driver of claim 9, wherein the scan output circuit of the first back dummy stage discharges the scan output node of the first back dummy stage in response to an (M+3)-th scan carry signal output by the scan carry output circuit of the third back dummy stage, and the scan carry output circuit of the first back dummy stage discharges the scan carry output node of the first back dummy stage in response to the (M+3)-th scan carry signal, wherein the sensing output circuit of the first back dummy stage discharges the sensing output node of the first back dummy stage in response to an (M+3)-th sensing carry signal output by the sensing carry output circuit of the third back dummy stage, and the sensing carry output circuit of the first back dummy stage discharges the sensing carry output node of the first back dummy stage in response to the (M+3)-th sensing carry signal, wherein the scan output circuit of the second back dummy stage discharges the scan output node of the second back dummy stage in response to the (M+4)-th scan carry signal output by the scan carry output circuit of the fourth back dummy stage, and the scan carry output circuit of the second back dummy stage discharges the scan carry output node of the second back dummy stage in response to the (M+4)-th scan carry signal, wherein the sensing output circuit of the second back dummy stage discharges the sensing output node of the second back dummy stage in response to the (M+4)-th sensing carry signal output by the sensing carry output circuit of the fourth back dummy stage, and the sensing carry output circuit of the second back dummy stage discharges the sensing carry output node of the second back dummy stage in response to the (M+4)-th sensing carry signal, wherein the scan output circuit of the third back dummy stage discharges the scan output node of the third back dummy stage in response to the fifth carry clock signal, and the scan carry output circuit of the third back dummy stage discharges the scan carry output node of the third back dummy stage in response to the fifth carry clock signal, wherein the sensing output circuit of the third back dummy stage discharges the sensing output node of the third back dummy stage in response to the fifth carry clock signal, and the sensing carry output circuit of the third back dummy stage discharges the sensing carry output node of the third back dummy stage in response to the fifth carry clock signal, wherein the scan output circuit of the fourth back dummy stage discharges the scan output node of the fourth back dummy stage in response to the sixth carry clock signal, and the scan carry output circuit of the fourth back dummy stage discharges the scan carry output node of the fourth back dummy stage in response to the sixth carry clock signal, and wherein the sensing output circuit of the fourth back dummy stage discharges the sensing output node of the fourth back dummy stage in response to the sixth carry clock signal, and the sensing carry output circuit of the fourth back dummy stage discharges the sensing carry output node of the fourth back dummy stage in response to the sixth carry clock signal.

11. The gate driver of claim 9, wherein the scan input circuit of the first back dummy stage charges the scan control node of the first back dummy stage in response to an (M−2)-th scan carry signal generated by an (M−2)-th active stage as the previous scan carry signal, wherein the sensing input circuit of the first back dummy stage charges the sensing control node of the first back dummy stage in response to an (M−2)-th sensing carry signal generated by the (M−2)-th active stage as the previous sensing carry signal, wherein the scan input circuit of the second back dummy stage charges the scan control node of the second back dummy stage in response to an (M−1)-th scan carry signal generated by an (M−1)-th active stage as the previous scan carry signal, wherein the sensing input circuit of the second back dummy stage charges the sensing control node of the second back dummy stage in response to an (M−1)-th sensing carry signal generated by the (M−1)-th active stage as the previous sensing carry signal, wherein the scan input circuit of the third back dummy stage charges the scan control node of the third back dummy stage in response to an (M+1)-th scan carry signal generated by the scan carry output circuit of the first back dummy stage as the previous scan carry signal, wherein the sensing input circuit of the third back dummy stage charges the sensing control node of the third back dummy stage in response to an (M+1)-th sensing carry signal generated by the sensing carry output circuit of the first back dummy stage as the previous scan carry signal, wherein the scan input circuit of the fourth back dummy stage charges the scan control node of the fourth back dummy stage in response to an (M+2)-th scan carry signal generated by the scan carry output circuit of the second back dummy stage as the previous scan carry signal, and wherein the sensing input circuit of the fourth back dummy stage charges the sensing control node of the fourth back dummy stage in response to an (M+2)-th sensing carry signal generated by the sensing carry output circuit of the second back dummy stage as the previous scan carry signal.

12. The gate driver of claim 8, wherein the clock signals include first, second, third, fourth, fifth and sixth scan clock signals, wherein the clock signals include first, second, third, fourth, fifth and sixth sensing clock signals, wherein the clock signals include first, second, third, fourth, fifth and sixth carry clock signals, wherein the K back dummy stages include first, second, third and fourth back dummy stages, wherein the first through (M+K)-th carry signals include first through (M+4)-th scan carry signals and first through (M+4)-th sensing carry signals, wherein the scan discharging circuit of the first back dummy stage discharges the scan control node of the first back dummy stage in response to the (M+4)-th scan carry signal output by the scan carry output circuit of the fourth back dummy stage, wherein the sensing discharging circuit of the first back dummy stage discharges the sensing control node of the first back dummy stage in response to the (M+4)-th sensing carry signal output by the sensing carry output circuit of the fourth back dummy stage, wherein the scan discharging circuit of the second back dummy stage discharges the scan control node of the second back dummy stage in response to the (M+4)-th scan carry signal or the fourth scan clock signal, wherein the sensing discharging circuit of the second back dummy stage discharges the sensing control node of the second back dummy stage in response to the (M+4)-th sensing carry signal or the fourth sensing clock signal, wherein the scan discharging circuit of the third back dummy stage discharges the scan control node of the third back dummy stage in response to the fifth scan clock signal, wherein the sensing discharging circuit of the third back dummy stage discharges the sensing control node of the third back dummy stage in response to the fifth sensing clock signal, wherein the scan discharging circuit of the fourth back dummy stage discharges the scan control node of the fourth back dummy stage in response to the sixth scan clock signal, and wherein the sensing discharging circuit of the fourth back dummy stage discharges the sensing control node of the fourth back dummy stage in response to the sixth sensing clock signal.

13. The gate driver of claim 8, wherein the scan input circuit includes:

a first scan transistor including a gate receiving the previous scan carry signal, a first terminal receiving the previous scan carry signal, and a second terminal;

a second scan transistor including a gate receiving the previous scan carry signal, a first terminal connected to the second terminal of the first scan transistor, and a second terminal connected to the scan control node; and a third scan transistor including a gate connected to the scan control node, a first terminal receiving a high gate voltage, and a second terminal connected to the first terminal of the second scan transistor, and wherein the sensing input circuit includes:

a first sensing transistor including a gate receiving the previous sensing carry signal, a first terminal receiving the previous sensing carry signal, and a second terminal;

a second sensing transistor including a gate receiving the previous sensing carry signal, a first terminal connected to the second terminal of the first sensing transistor, and a second terminal connected to the sensing control node; and a third sensing transistor including a gate connected to the sensing control node, a first terminal receiving the high gate voltage, and a second terminal connected to the first terminal of the second sensing transistor.

14. The gate driver of claim 8, wherein the scan inverting circuit includes:

a first scan transistor including a gate receiving a direct current (DC) voltage, a first terminal receiving the DC voltage, and a second terminal;

a second scan transistor including a gate connected to the second terminal of the first scan transistor, a first terminal receiving the DC voltage, and a second terminal connected to the scan inverting node; a third scan transistor including a gate connected to the scan control node, a first terminal connected to the gate of the second scan transistor, and a second terminal receiving a second low gate voltage; and a fourth scan transistor including a gate connected to the scan control node, a first terminal connected to the scan inverting node, and a second terminal receiving a first low gate voltage, and wherein the sensing inverting circuit includes:

a first sensing transistor including a gate receiving the DC voltage, a first terminal receiving the DC voltage, and a second terminal;

a second sensing transistor including a gate connected to the second terminal of the first sensing transistor, a first terminal receiving the DC voltage, and a second terminal connected to the sensing inverting node;

a third sensing transistor including a gate connected to the sensing control node, a first terminal connected to the gate of the second sensing transistor, and a second terminal receiving the second low gate voltage; and a fourth sensing transistor including a gate connected to the sensing control node, a first terminal connected to the sensing inverting node, and a second terminal receiving the first low gate voltage.

15. The gate driver of claim 8, wherein the clock signals include first, second, third, fourth, fifth and sixth scan clock signals, wherein the clock signals include first, second, third, fourth, fifth and sixth sensing clock signals, wherein the clock signals include first, second, third, fourth, fifth and sixth carry clock signals, wherein the scan output circuit includes:

a first scan transistor including a gate connected to the scan control node, a first terminal receiving one of the first through sixth scan clock signals, and a second terminal connected to the scan output node; a first capacitor including a first electrode connected to the scan control node and a second electrode connected to the scan output node;

a second scan transistor including a gate connected to the scan inverting node, a first terminal connected to the scan output node, and a second terminal receiving a second low gate voltage; and a third scan transistor including a gate receiving a next scan carry signal or one of the first through sixth carry clock signals, a first terminal connected to the scan output node, and a second terminal receiving the second low gate voltage, and wherein the sensing output circuit includes: a first sensing transistor including a gate connected to the sensing control node, a first terminal receiving one of the first through sixth sensing clock signals, and a second terminal connected to the sensing output node;

a second capacitor including a first electrode connected to the sensing control node and a second electrode connected to the sensing output node; a second sensing transistor including a gate connected to the sensing inverting node, a first terminal connected to the sensing output node, and a second terminal receiving the second low gate voltage; and a third sensing transistor including a gate receiving a next sensing carry signal or one of the first through sixth carry clock signals, a first terminal connected to the sensing output node, and a second terminal receiving the second low gate voltage.

16. The gate driver of claim 8, wherein the clock signals include first, second, third, fourth, fifth and sixth scan clock signals, wherein the clock signals include first, second, third, fourth, fifth and sixth sensing clock signals, wherein the clock signals include first, second, third, fourth, fifth and sixth carry clock signals, wherein the scan carry output circuit includes: a first scan transistor including a gate connected to the scan control node, a first terminal receiving one of the first through sixth carry clock signals, and a second terminal connected to the scan carry output node; a second scan transistor including a gate connected to the scan inverting node, a first terminal connected to the scan carry output node, and a second terminal receiving a first low gate voltage; and a third scan transistor including a gate receiving a next scan carry signal or one of the first through sixth carry clock signals, a first terminal connected to the scan carry output node, and a second terminal receiving the first low gate voltage, and wherein the sensing carry output circuit includes: a first sensing transistor including a gate connected to the sensing control node, a first terminal receiving one of the first through sixth carry clock signals, and a second terminal connected to the sensing carry output node; a second sensing transistor including a gate connected to the sensing inverting node, a first terminal connected to the sensing carry output node, and a second terminal receiving the first low gate voltage; and a third sensing transistor including a gate receiving a next sensing carry signal or one of the first through sixth carry clock signals, a first terminal connected to the sensing carry output node, and a second terminal receiving the first low gate voltage.

17. The gate driver of claim 8, wherein the clock signals include first, second, third, fourth, fifth and sixth scan clock signals, wherein the clock signals include first, second, third, fourth, fifth and sixth sensing clock signals, wherein the clock signals include first, second, third, fourth, fifth and sixth carry clock signals, wherein the scan discharging circuit includes:

a first scan transistor including a gate receiving a scan start signal, a first terminal connected to the scan control node, and a second terminal receiving a first low gate voltage;

a second scan transistor including a gate receiving a next scan carry signal or one of the first through sixth carry clock signals, a first terminal connected to the scan control node, and a second terminal receiving the first low gate voltage; and a third scan transistor including a gate connected to the scan inverting node, a first terminal connected to the scan control node, and a second terminal receiving the first low gate voltage, and wherein the sensing discharging circuit includes:

a first sensing transistor including a gate receiving the scan start signal, a first terminal connected to the sensing control node, and a second terminal receiving the first low gate voltage;

a second sensing transistor including a gate receiving a next sensing carry signal or one of the first through sixth carry clock signals, a first terminal connected to the sensing control node, and a second terminal receiving the first low gate voltage; and a third sensing transistor including a gate connected to the sensing inverting node, a first terminal connected to the sensing control node, and a second terminal receiving the first low gate voltage.

18. A gate driver comprising:

first through M-th active stages configured to generate first through M-th scan signals based on first through sixth scan clock signals, to generate first through M-th sensing signals based on first through sixth sensing clock signals, and to generate first through M-th scan carry signals and first through M-th sensing carry signals based on first through sixth carry clock signals, where M is an integer greater than or equal to 4; and first through fourth back dummy stages configured to generate (M+1)-th through (M+4)-th scan carry signals and (M+1)-th through (M+4)-th sensing carry signals based on the first through fourth carry clock signals, wherein an N-th active stage of the first through M-th active stages charges a scan control node of the N-th active stage based on an (N−3)-th scan carry signal, charges a sensing control node of the N-th active stage based on an (N−3)-th sensing carry signal, discharges the scan control node of the N-th active stage based on an (N+3)-th scan carry signal, and discharges the sensing control node of the N-th active stage based on an (N+3)-th sensing carry signal, where N is an integer greater than or equal to 1, and is less than or equal to M, wherein the first back dummy stage charges a scan control node of the first back dummy stage based on an (M−2)-th scan carry signal, charges a sensing control node of the first back dummy stage based on an (M−2)-th sensing carry signal, discharges the scan control node of the first back dummy stage based on the (M+4)-th scan carry signal, and discharges the sensing control node of the first back dummy stage based on the (M+4)-th sensing carry signal, wherein the second back dummy stage charges a scan control node of the second back dummy stage based on an (M−1)-th scan carry signal, charges a sensing control node of the second back dummy stage based on an (M−1)-th sensing carry signal, discharges the scan control node of the second back dummy stage based on the (M+4)-th scan carry signal, and discharges the sensing control node of the second back dummy stage based on the (M+4)-th sensing carry signal, wherein the third back dummy stage charges a scan control node of the third back dummy stage based on the (M+1)-th scan carry signal, charges a sensing control node of the third back dummy stage based on the (M+1)-th sensing carry signal, discharges the scan control node of the third back dummy stage based on the fifth carry clock signal, and discharges the sensing control node of the third back dummy stage based on the fifth carry clock signal, and wherein the fourth back dummy stage charges a scan control node of the fourth back dummy stage based on an (M+2)-th scan carry signal, charges a sensing control node of the fourth back dummy stage based on an (M+2)-th sensing carry signal, discharges the scan control node of the fourth back dummy stage based on the sixth carry clock signal, and discharges the sensing control node of the fourth back dummy stage based on the sixth carry clock signal.

19. The gate driver of claim 18, wherein the N-th active stage discharges a scan output node and a scan carry output node of the N-th active stage based on an (N+2)-th scan carry signal, and discharges a sensing output node and a scan carry sensing node of the N-th active stage based on an (N+2)-th sensing carry signal, wherein the first back dummy stage discharges a scan output node and a scan carry output node of the first back dummy stage based on an (M+3)-th scan carry signal, and discharges a sensing output node and a scan carry sensing node of the first back dummy stage based on an (M+3)-th sensing carry signal, wherein the second back dummy stage discharges a scan output node and a scan carry output node of the second back dummy stage based on the (M+4)-th scan carry signal, and discharges a sensing output node and a scan carry sensing node of the second back dummy stage based on the (M+4)-th sensing carry signal, wherein the third back dummy stage discharges a scan output node and a scan carry output node of the third back dummy stage based on the fifth carry clock signal, and discharges a sensing output node and a scan carry sensing node of the third back dummy stage based on the fifth carry clock signal, and wherein the fourth back dummy stage discharges a scan output node and a scan carry output node of the fourth back dummy stage based on the sixth carry clock signal, and discharges a sensing output node and a scan carry sensing node of the fourth back dummy stage based on the sixth carry clock signal.

20. An electronic device comprising:

a display panel including pixels;

a data driver configured to provide data voltages to the pixels;

a gate driver configured to provide first through M-th gate signals to the pixels, where M is an integer greater than or equal to 4; and a controller configured to control the data driver and the gate driver, wherein the gate driver includes:

M active stages configured to generate first through M-th carry signals and the first through M-th gate signals based on clock signals; and K back dummy stages configured to generate (M+1)-th through (M+K)-th carry signals based on the clock signals, where K is an integer greater than or equal to 3, wherein an N-th active stage of the M active stages discharges a control node of the N-th active stage based on an (N+3)-th carry signal, where N is an integer greater than or equal to 1, and is less than or equal to M, wherein at least one back dummy stage of the K back dummy stages discharges a control node of the at least one back dummy stage based on a corresponding clock signal of the clock signals, and wherein at least one other back dummy stage of the K back dummy stages discharges a control node of the at least one other back dummy stage based on a carry signal generated by a subsequent stage.

* * * * *